(12) United States Patent
Ohmiya

(10) Patent No.: US 9,628,664 B2
(45) Date of Patent: Apr. 18, 2017

(54) IMAGE FORMING SYSTEM HAVING PLURAL IMAGE FORMING APPARATUSES

(71) Applicant: Brother Kogyo Kabushiki Kaisha, Nagoya-shi, Aichi-ken (JP)

(72) Inventor: Takashi Ohmiya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/000,083

(22) Filed: Jan. 19, 2016

(65) Prior Publication Data

US 2016/0219184 A1    Jul. 28, 2016

(30) Foreign Application Priority Data

Jan. 22, 2015   (JP) ................................ 2015-010571

(51) Int. Cl.
| | |
|---|---|
| *G06F 15/00* | (2006.01) |
| *H04N 1/32* | (2006.01) |
| *H04N 1/00* | (2006.01) |
| *H04N 1/21* | (2006.01) |

(52) U.S. Cl.
CPC ..... *H04N 1/32358* (2013.01); *H04N 1/00204* (2013.01); *H04N 1/00244* (2013.01); *H04N 1/00307* (2013.01); *H04N 1/00347* (2013.01); *H04N 1/21* (2013.01); *H04N 1/32448* (2013.01); *H04N 2201/006* (2013.01); *H04N 2201/0036* (2013.01); *H04N 2201/0046* (2013.01); *H04N 2201/0094* (2013.01)

(58) Field of Classification Search
USPC ............................................... 358/1.13–1.15
See application file for complete search history.

(56) References Cited

U.S. PATENT DOCUMENTS

2013/0231051 A1*  9/2013  Naruse .................. G06F 3/1204
                                                    455/41.2

FOREIGN PATENT DOCUMENTS

| JP | 2001285539 A | 10/2001 |
|---|---|---|
| JP | 2005190171 A | 7/2005 |

* cited by examiner

*Primary Examiner* — Saeid Ebrahimi Dehkord
(74) *Attorney, Agent, or Firm* — Banner & Witcoff, Ltd.

(57) ABSTRACT

In an image forming system, a first communication unit in a first image forming apparatus is controlled to transmit first data to a fifth communication unit in a portable terminal. The fifth communication unit is controlled to transmit second data to a third communication unit in a second image forming apparatus. Each of the first and second data includes image data specifying information and communication setting information. A fourth communication unit in the second image forming apparatus is controlled to establish second type communication between a second communication unit and the fourth communication unit in the second image forming apparatus based on the communication setting information. The fourth communication unit is controlled to transmit, to the second communication unit, a request for transmission of image data specified by the image data specifying information. The second communication unit is controlled to transmit the image data to the fourth communication unit.

17 Claims, 17 Drawing Sheets

IMAGE FORMING SYSTEM HAVING PLURAL IMAGE FORMING APPARATUSES

CROSS REFERENCE TO RELATED APPLICATION

This application claims priority from Japanese Patent Application No. 2015-010571 filed Jan. 22, 2015. The entire content of the priority application is incorporated herein by reference.

TECHNICAL FIELD

The present disclosure relates to an image forming system, an image forming apparatus, an image forming method, and a program storage medium.

BACKGROUND

Recently, there are provided in an office a plurality of image forming apparatus, such as printers and multi-function peripherals.

In a case where a printer is connected to a PC (personal computer) via a LAN (Local Area Network), a print job is sent from the PC to the printer through the LAN, in order to use the printer. The print job is stored in a memory provided in the printer.

If the printer is capable of performing printing when the print job is stored in the memory of the printer, the printer immediately executes the print job to form on sheets images for the print job. However, there is a case that when the print job is stored in the memory, the printer is incapable of performing printing due to an error occurring in the printer. For example, the printer becomes unable to perform printing when a sheet is jammed, sheets run out, or toner runs out. In such a case, the printer is unable to execute the print job until the printer recovers from the error. If the user desires to immediately obtain printed sheets for the print job, the user has to again perform the operations to input the print job in another printer.

There has been proposed various technologies that can reduce the troublesome task that the user needs to perform when an error occurs in the printer. For example, there is proposed a technology in which when a multi-function peripheral device becomes unable to print received facsimile data, the multi-function peripheral device transfers the facsimile data to another device that is designated by a user or that is preset in the multi-function peripheral device. This technology is described in Japanese Patent Application Publication No. 2001-285539, for example. There is proposed another technology in which when an image printing and vending machine becomes unable to print inputted image data, the image printing and vending machine displays a map, on which other machines capable of performing printing are indicated, and transfers the image data to one of the printable machines upon receipt of a user's designation of the printable machine. This technology is described in Japanese Patent Application Publication No. 2005-190171, for example.

SUMMARY

In the above-described technologies, however, both of the multi-function peripheral device and the image printing and vending machine have to be set with information of a transfer destination, such as an address of the transfer destination. This setting operation is troublesome.

It is therefore an object of the disclosure to provide an image forming system in which image data can be transferred from an image forming apparatus to another image forming apparatus by a user performing a simple operation, the image forming apparatus, the another image forming apparatus, an image forming method for the image forming system, and a program storage medium for the another image forming apparatus.

According to one aspect, an image forming system including: a first image forming apparatus; a second image forming apparatus; and a portable terminal.

The first image forming apparatus includes: a first storage unit; a first image forming unit configured to form an image on a recording medium; a first communication unit configured to perform a first type communication that is a near-field type wireless communication; a second communication unit configured to perform a second type communication whose communication rate is faster than that of the first type communication; and a first controller.

The second image forming apparatus includes: a second storage unit; a second image forming unit configured to form an image on a recording medium; a third communication unit configured to perform the first type communication; a fourth communication unit configured to perform the second type communication; and a second controller.

The portable terminal includes: a terminal storage unit; a fifth communication unit configured to perform the first type communication; and a terminal controller.

The first controller is configured to perform: storing image data in the first storage unit; and controlling the first communication unit to transmit first data to the fifth communication unit. The first data contains: image data specifying information specifying the image data stored in the first storage unit; and communication setting information necessary for establishing the second type communication between the second communication unit and the fourth communication unit.

The terminal controller is configured to perform: storing, in the terminal storage unit, second data that corresponds to the first data received by the fifth communication unit; and controlling the fifth communication unit to transmit, to the third communication unit, the second data stored in the terminal storage unit. The second data contains: image data specifying information specifying the image data stored in the first storage unit; and communication setting information necessary for establishing the second type communication between the second communication unit and the fourth communication unit.

The second controller is configured to perform: controlling the fourth communication unit to establish the second type communication between the second communication unit and the fourth communication unit based on the communication setting information contained in the second data received by the third communication unit; and after the second type communication is established between the second communication unit and the fourth communication unit, controlling the fourth communication unit to transmit, to the second communication unit, a request for transmission of the image data specified by the image data specifying information contained in the second data.

The first controller is configured to perform: controlling the second communication unit to transmit to the fourth communication unit the image data whose transmission is requested in the request received by the second communication unit.

The second controller is configured to perform: storing, in the second storage unit, the image data received by the fourth communication unit; and controlling the second image forming unit to form an image on a recording medium based on the image data stored in the second storage unit.

According to another aspect, an image forming system includes: a first image forming apparatus; a second image forming apparatus; a portable terminal; and a server.

The first image forming apparatus includes: a first storage unit; a first image forming unit configured to form an image on a recording medium; a first communication unit configured to perform a first type communication that is a near-field type wireless communication; a second communication unit configured to perform a second type communication whose communication rate is faster than that of the first type communication; and a first controller.

The second image forming apparatus includes: a second storage unit; a second image forming unit configured to form an image on a recording medium; a third communication unit configured to perform the first type communication; a fourth communication unit configured to perform the second type communication; and a second controller.

The portable terminal includes: a terminal storage unit; a fifth communication unit configured to perform the first type communication; and a terminal controller.

The server includes: a server storage unit; a server communication unit configured to perform the second type communication; and a server controller.

The first controller is configured to perform: storing image data in the first storage unit.

The first controller is configured to perform: controlling the first communication unit to transmit first server communication data to the fifth communication unit. The first server communication data contains: image data specifying information that is capable of specifying the image data when the image data is stored in the server storage unit; and communication setting information necessary for establishing the second type communication between the server communication unit and the fourth communication unit.

The terminal controller is configured to perform: storing, in the terminal storage unit, second server communication data that corresponds to the first server communication data received by the fifth communication unit. The second server communication data contains: image data specifying information that is capable of specifying the image data when the image data is stored in the server storage unit; and communication setting information necessary for establishing the second type communication between the server communication unit and the fourth communication unit.

The first controller is configured to perform: controlling the second communication unit to transmit the image data stored in the first storage unit to the server communication unit.

The server controller is configured to perform: storing, in the server storage unit, the image data received by the server communication unit.

The terminal controller is configured to perform: controlling the fifth communication unit to transmit, to the third communication unit, the second server communication data stored in the terminal storage unit.

The second controller is configured to perform: controlling the fourth communication unit to establish the second type communication between the server communication unit and the fourth communication unit based on the communication setting information contained in the second server communication data received by the third communication unit; and after the second type communication is established between the server communication unit and the fourth communication unit, controlling the fourth communication unit to transmit, to the server communication unit, a request for transmission of the image data specified by the image data specifying information contained in the second server communication data.

The server controller is configured to perform: controlling the server communication unit to transmit to the fourth communication unit the image data whose transmission is requested in the request received by the server communication unit.

The second controller is configured to perform: storing, in the second storage unit, the image data received by the fourth communication unit; and controlling the second image forming unit to form an image on a recording medium based on the image data stored in the second storage unit.

According to another aspect, an image forming method is provided for an image forming system including: a first image forming apparatus; a second image forming apparatus; and a portable terminal. The first image forming apparatus includes: a first storage unit; a first image forming unit configured to form an image on a recording medium; a first communication unit configured to perform a first type communication that is a near-field type wireless communication; a second communication unit configured to perform a second type communication whose communication rate is faster than that of the first type communication; and a first controller. The second image forming apparatus includes: a second storage unit; a second image forming unit configured to form an image on a recording medium; and a third communication unit configured to perform the first type communication; a fourth communication unit configured to perform the second type communication; and a second controller. The portable terminal includes: a terminal storage unit; and a fifth communication unit configured to perform the first type communication. The method includes: storing image data in the first storage unit; after storage of image data in the first storage unit, transmitting first data from the first communication unit to the fifth communication unit, the first data containing: image data specifying information specifying the image data stored in the first storage unit; and communication setting information necessary for establishing the second type communication between the second communication unit and the fourth communication unit; after transmission of the first data from the first communication unit to the fifth communication unit, storing, in the terminal storage unit, second data that corresponds to the first data received by the fifth communication unit, the second data containing: image data specifying information specifying the image data stored in the first storage unit; and communication setting information necessary for establishing the second type communication between the second communication unit and the fourth communication unit; after storage of the second data in the terminal storage unit, transmitting, from the fifth communication unit to the third communication unit, the second data stored in the terminal storage unit; after transmission of the second data from the fifth communication unit to the third communication unit, establishing the second type communication between the second communication unit and the fourth communication unit based on the communication setting information contained in the second data received by the third communication unit; after establishment of the second type communication between the second communication unit and the fourth communication unit, transmitting, from the fourth communication unit to the second communication unit, a request for transmission of the image data specified by the image data specifying information contained in the second data; after transmission of the request, transmitting, from the second communication unit to the fourth communication unit, the image data whose transmission is requested in the request received by the second communication unit; after transmission of the image data from the second communication unit to the fourth communication unit, storing, in the second storage unit, the image data received by the fourth communication unit; and after storage of the image data in the second storage unit, forming an image on a recording medium by the second image forming unit based on the image data stored in the second storage unit.

According to another aspect, an image forming apparatus, together with another image forming apparatus and a portable terminal, constitutes an image forming system. The portable terminal includes a terminal communication unit configured to perform a first type communication that is a near-field type wireless communication. The another image forming apparatus includes: an image data storage unit; and a communication unit configured to perform a second type communication whose communication rate is faster than that of the first type communication. The image forming apparatus includes: a storage unit; an image forming unit configured to form an image on a recording medium; a low-communication-rate communication unit configured to perform the first type communication; a high-communication-rate communication unit configured to perform the second type communication; and a controller. The controller is configured to perform: receiving, by the low-communication-rate communication unit, first data that is transmitted via the terminal communication unit through the first type communication, the first data containing: image data specifying information specifying the image data stored in the image data storage unit; and communication setting information necessary for establishing the second type communication between the communication unit and the high-communication-rate communication unit; controlling the high-communication-rate communication unit to establish the second type communication between the communication unit and the high-communication-rate communication unit based on the communication setting information contained in the first data received by the low-communication-rate communication unit; after establishment of the second type communication between the communication unit and the high-communication-rate communication unit, controlling the high-communication-rate communication unit to transmit, to the communication unit, a request for transmission of the image data specified by the image data specifying information; after transmission of the request for transmission, storing, in the storage unit, image data that is transmitted from the communication unit and is received by the high-communication-rate communication unit; and controlling the image forming unit to form an image on a recording medium based on the image data stored in the storage unit.

According to another aspect, an image forming apparatus constitutes, together with another image forming apparatus and a portable terminal, an image forming system. The portable terminal includes a terminal communication unit configured to perform a first type communication that is a near-field type wireless communication. The another image forming apparatus includes a communication unit configured to perform a second type communication whose communication rate is faster than that of the first type communication. The image forming apparatus includes: a storage unit; an image forming unit configured to form an image on a recording medium; a low-communication-rate communication unit configured to perform the first type communication; a high-communication-rate communication unit configured to perform the second type communication; and a controller. The controller is configured to perform: storing image data in the storage unit; controlling the low-communication-rate communication unit to transmit first data to the terminal communication unit, the first data containing: image data specifying information specifying the image data stored in the storage unit; and communication setting information necessary for establishing the second type communication between the high-communication-rate communication unit and the communication unit; controlling the high-communication-rate communication unit to establish the second type communication between the high-communication-rate communication unit and the communication unit in response to a request for establishment of the second communication that is transmitted from the communication unit to the high-communication-rate communication unit; and after establishment of the second type communication between the high-communication-rate communication unit and the communication unit and in response to a request for transmission of the image data specified by the image data specifying information, controlling the high-communication-rate communication unit to transmit to the communication unit the image data whose transmission is requested in the request.

According to another aspect, a non-transitory computer readable storage medium stores a set of program instructions for an image forming apparatus. The image forming apparatus, together with another image forming apparatus and a portable terminal, constitutes an image forming system. The portable terminal includes a terminal communication unit configured to perform a first type communication that is a near-field type wireless communication. The another image forming apparatus includes: an image data storage unit; and a communication unit configured to perform a second type communication whose communication rate is faster than that of the first type communication. The image forming apparatus includes: a storage unit; an image forming unit configured to form an image on a recording medium; a low-communication-rate communication unit configured to perform the first type communication; and a high-communication-rate communication unit configured to perform the second type communication. The program instructions, when executed by a computer in the image forming apparatus, controls the image forming apparatus to perform: receiving, by the low-communication-rate communication unit, first data that is transmitted from the communication unit through the first type communication, the first data containing: image data specifying information specifying the image data stored in the image data storage unit; and communication setting information necessary for establishing the second type communication between the communication unit and the high-communication-rate communication unit; controlling the high-communication-rate communication unit to establish the second type communication between the communication unit and the high-communication-rate communication unit based on the communication setting information contained in the first data received by the low-communication-rate communication unit; after establishment of the second type communication between the communication unit and the high-communication-rate communication unit, controlling the high-communication-rate communication unit to transmit, to the communication unit, a request for transmission of the image data specified by the image data specifying information; after transmission of the request for transmission, storing, in the storage unit, image data that is transmitted from the communication unit and is received by the high-communication-rate communication unit; and controlling the image forming unit to form an image on a recording medium based on the image data stored in the storage unit.

BRIEF DESCRIPTION OF THE DRAWINGS

The particular features and advantages of the disclosure will become apparent from the following description taken in connection with the accompanying drawings, in which.

DETAILED DESCRIPTION

Figure 1:
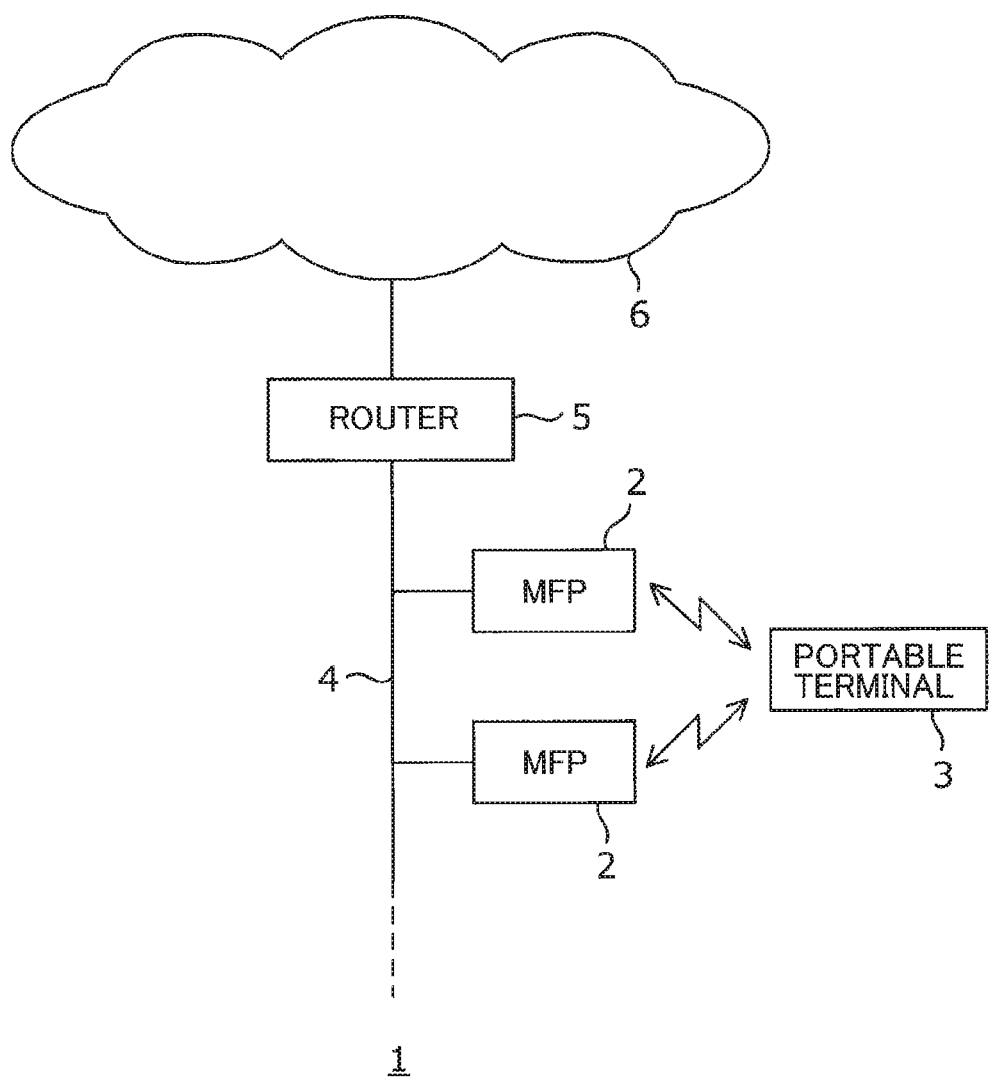
FIG. 1 schematically illustrates an image forming system according to a first embodiment.

An image forming system according to embodiments will be described while referring to the accompanying drawings wherein like parts and components are designated by the same reference numerals to avoid duplicating description.
<First Embodiment>
Hereinafter, an image forming system according to a first embodiment will be described with reference to the accompanying drawings.

<System Configuration>
As illustrated in FIG. 1, an image forming system 1 includes a plurality of MFPs (Multi-Function Peripherals) 2 and a portable terminal 3. The MFPs 2, serving as an example of a first image forming apparatus and a second image forming apparatus, are printer MFPs which have both of a printer function and a scanner function. The portable terminal 3 is, for example, a smartphone or a portable telephone.

Each MFP 2 is connected to a LAN (Local Area Network) 4. Each MFP 2 can perform communication therebetween through the LAN 4. The LAN 4 may be a wired LAN or a wireless LAN. Or, the LAN 4 may include both of a wired LAN and a wireless LAN. The LAN 4 is connected to the Internet 6 through a router 5. Each of MFPs 2 and the portable terminal 3 has a function of performing near-field type radio communication (an example of first communication) according to the NFC (Near Field Communication) standard. The MFPs 2 and the portable terminal 3 can therefore perform the NFC communication (an example of near-field type wireless communication). The NFC is compliant with the international standards such as ISO/IEC14443, ISO/IEC18092, ISO/IEC15693, and ISO/IEC21481, and uses a communication frequency in a band of 13.56 MHz at a communication rate of 424 kbps or less.

Figure 2:
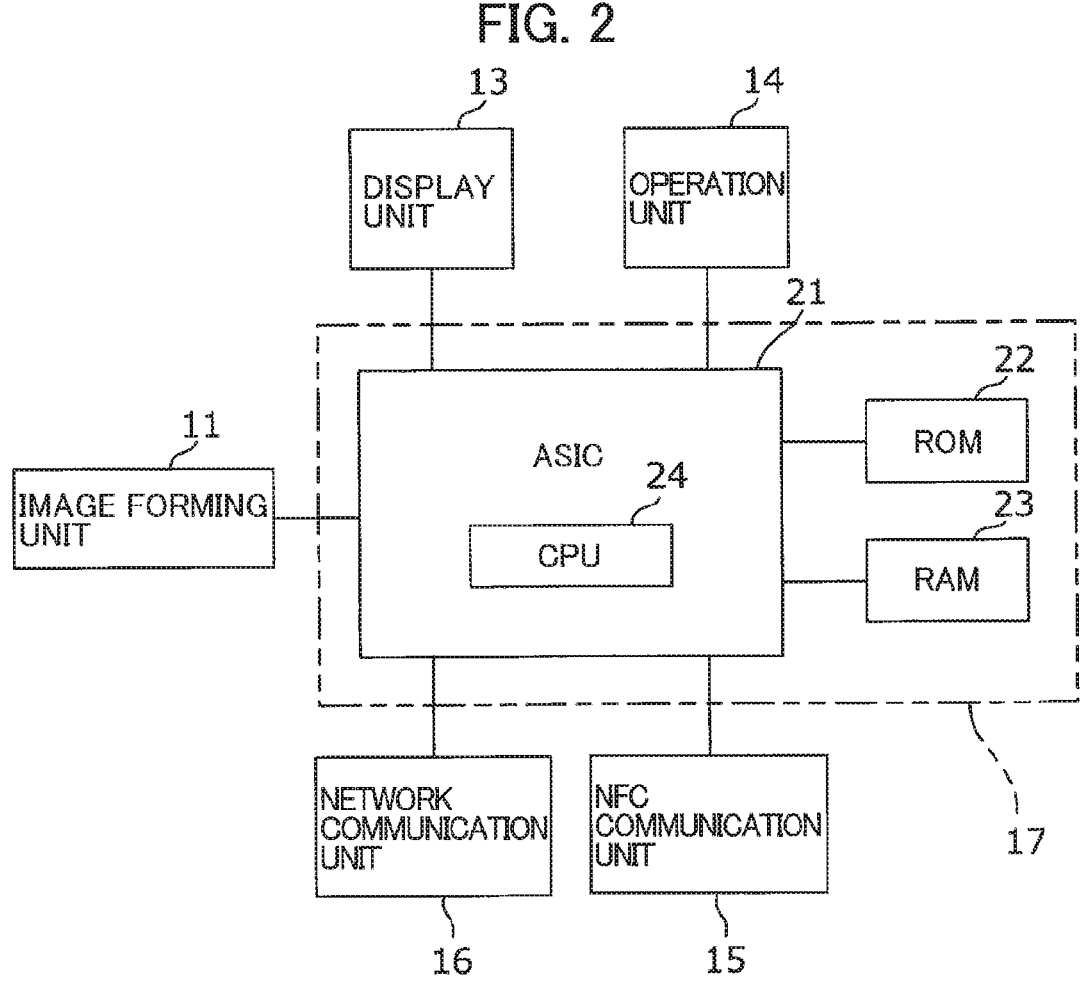
FIG. 2 is a block diagram showing an essential part of an electric configuration of each MFP (multifunction peripheral) shown in FIG. 1.

<Electrical Configuration of MFP>
As illustrated in FIG. 2, the MFP 2 includes an image forming unit 11, a display unit 13, an operation unit 14, an NFC communication unit 15, a network communication unit 16, and a control unit 17.

The image forming unit 11, serving as an example of a first image forming unit and a second image forming unit, performs printing (a color printing or a monochrome printing) based on image data, and forms images on sheets. Examples of the method of forming images include an electrophotographic method and an inkjet method.

The display unit 13 is configured by a liquid crystal display, for example.

The operation unit 14 is provided with operation buttons (for example, start key, numeric keypad, cursor keys) which are operated by a user to input various types of commands.

The NFC communication unit 15, serving as an example of a first communication unit and a third communication unit, is provided with an antenna and an IC chip for performing the near-field type radio communication.

The network communication unit 16, serving as an example of a second communication unit and a fourth communication unit, is provided with a circuit for performing network communication (LAN communication) through the LAN 4 (see FIG. 1). Examples of the LAN communication (an example of second communication) include: communications compliant with Ethernet (registered trademark) standard, such as 10BASE-T, 100BASE-TX, and 1000BASE-T; and communications compliant with other standards such as IEEE802.11. A typical communication rate of the LAN communication is 10 to 100 Mbps, and is faster than that of the NFC communication described above.

The control unit 17 has an ASIC (Application Specific Integrated Circuit) 21, a ROM 22, and a RAM 23.

A CPU 24, serving as an example of a first controller and a second controller, is built in the ASIC 21. The ASIC 21 receives signals such as image data received by the network communication unit 16 and an operation signal indicating an operation content of the operation unit 14. By executing programs stored in the ROM 22 based on the signals inputted to the ASIC 21, the CPU 24 controls the image forming unit 11 and the display unit 13 and controls the NFC communication unit 15 and the network communication unit 16 to perform communication. The ROM 23 stores therein programs for first, third, fifth, and sixth communication processes to be described later with reference to FIGS. 5, 7, 9, and 10. Thus, the programs for the first, third, fifth, and sixth communication processes are installed in the computer of the MFP 2. The CPU 24 uses the RAM 23 as a work area when the CPU 24 controls the various units in the MFP 2 by executing the programs. Serving as an example of a first storage unit and a second storage unit, the RAM 23 temporarily stores image data to be printed by the image forming unit 11 and image data received by the network communication unit 16.

<Electrical Configuration of Portable Terminal>

Figure 3:
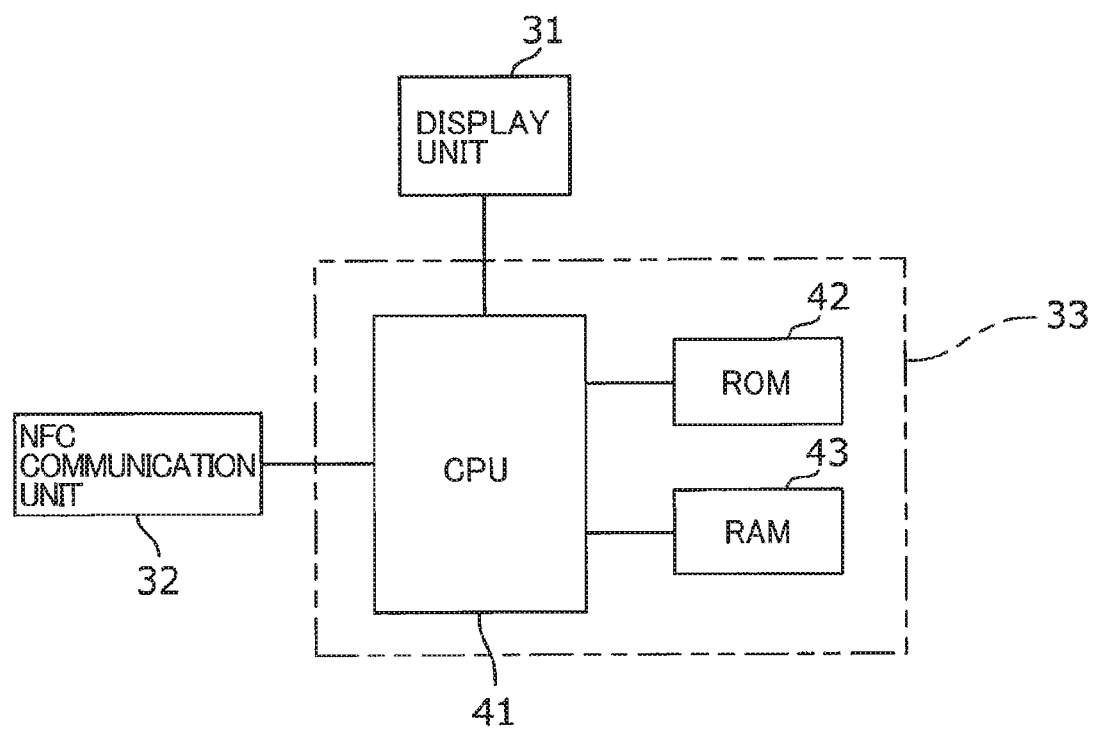
FIG. 3 is a block diagram showing an essential part of an electric configuration of a portable terminal shown in FIG. 1.

As illustrated in FIG. 3, the portable terminal 3 is provided with a display unit 31, an NFC communication unit 32, and a control unit 33.

The display unit 31, serving as a terminal display unit, is configured by a liquid crystal display, for example.

The NFC communication unit 32, serving as an example of a fifth communication unit, is provided with an antenna and an IC chip for performing the near-field type radio communication.

The control unit 33 has: a CPU 41 serving as an example of a terminal controller, a ROM 42; and a RAM 43 serving as an example a terminal storage unit. By executing programs stored in the ROM 42, the CPU 41 controls the display unit 31 and controls the NFC communication unit 32 to perform communication. The ROM 42 stores therein programs for second and fourth communication processes to be described later with reference to FIGS. 6 and 8. Thus, the programs for the second and fourth communication processes are installed in the computer for the portable terminal 3. The CPU 41 uses the RAM 43 as a work area when the CPU 41 controls the various units in the portable terminal 3 by executing the programs.

<Outline of Communication>

In the image forming system 1, for example, a user can control the MFP 2 to execute a print job by transmitting image data, a print condition (for example, the number of copies and color/monochrome), and a user ID to the MFP 2 from a PC (not illustrated) connected to the LAN 4. It is noted that "print job" is a set of data that contains at least the image data and the print condition. The print job may also contain the user ID therein. "To execute a print job" means to print images based on the image data contained in the print job under the print condition also contained in the print job. The user becomes entitled to control the MFP 2 to perform print jobs for image data corresponding to the user ID by inputting authentication information (password) corresponding to the user ID to the MFP 2 through the operation unit 14 or the NFC communication unit 15. The user controls the MFP 2 to perform a print job by operating the operation unit 14 to designate image data. In order to input the authentication information through the NFC communication unit 15, for example, the user can hold his/her ID card over the NFC communication unit 15 so that the authentication information stored in the IC chip in the ID card is transmitted to the NFC communication unit 15. It is noted that when the image data, the print condition, and the user ID are inputted to the MFP 2, the CPU 24 associates the inputted image data, print condition, and user ID with job specifying information (for example, a job number), and stores the associated information (image data, print condition, and user ID) together with the job specifying information in the RAM 23 as a print job.

In a case where the image forming unit 11 is in a print enable state and is capable of printing images at the time when the print job is stored in the RAM 23, the image forming unit 11 executes the print job immediately to form on sheets images related to the print job. However, there is such a case that the image forming unit 11 is unable to execute a print job when the print job is stored in the RAM 23. For example, the image forming unit 11 may be in a print disabled state because an error occurs, that is, for example, a sheet is jammed, sheets run out, or toner runs out. Or, the image forming apparatus may be in a busy state because the image forming apparatus is used by another user. In such a case, the user brings the portable terminal 3 to a position close to the MFP 2 where the print job is stored, and performs NFC communication between the portable terminal 3 and the MFP 2. Then, the user brings the portable terminal 3 to a position close to the other MFP 2, which is in a state of capable of printing the print job, and performs NFC communication between the portable terminal 3 and the other MFP 2, thereby controlling the other MFP 2 to execute the print job.

There is another case that the image forming unit 11 enters the print disabled state due to occurrence of an error in the middle of performing a print job. Also in this case, the user can bring the portable terminal 3 to a position close to the MFP 2 where the print job is stored, and performs NFC communication between the portable terminal 3 and the MFP 2. Then, the user brings the portable terminal 3 to a position close to the other MFP 2 which is capable of printing, and performs NFC communication between the portable terminal 3 and the other MFP 2, thereby controlling the other MFP 2 to execute the remaining portion of the print job that has not been executed by the first MFP 2.

Hereinafter, the communication performed in the above-described cases will be described in more detail. It is noted that in order to distinguish the MFP 2 on which the portable terminal 3 performs NFC communication first from the MFP 2 on which the portable terminal 3 performs NFC communication next, the former will be referred to as a "first MFP 2", and the latter will be referred to as a "second MFP 2".

Figure 4:
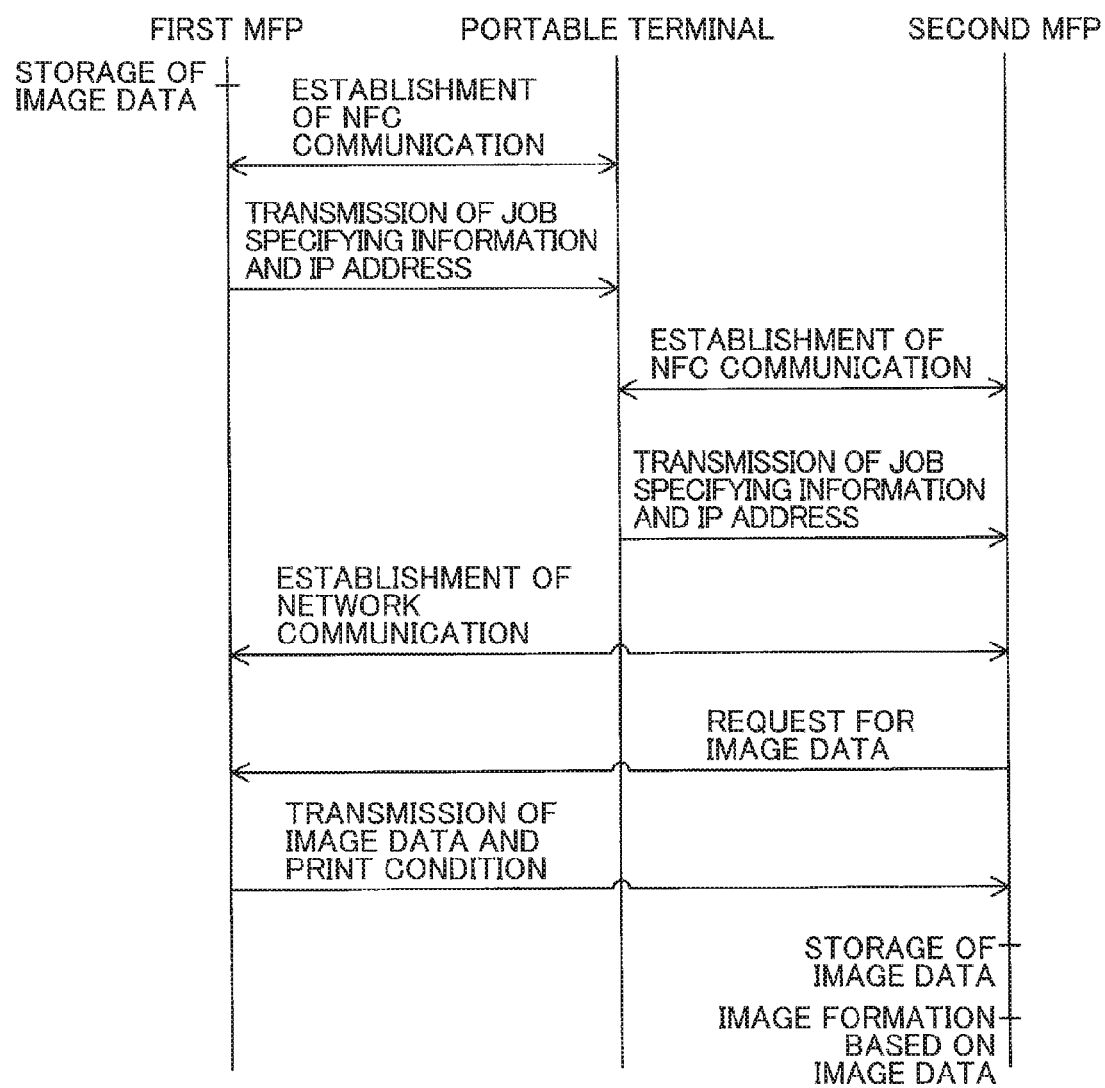
FIG. 4 illustrates an outline of communication performed in the image forming system of FIG. 1 according to the first embodiment.

When the NFC communication unit 32 of the portable terminal 3 is brought to a position close to the NFC communication unit 15 of the first MFP 2, NFC communication is established between the NFC communication unit 15 of the first MFP 2 and the NFC communication unit 32 of the portable terminal 3 as illustrated in FIG. 4.

Thereafter, the CPU 24 of the first MFP 2 transmits, through the NFC communication from the NFC communication unit 15 of the first MFP 2 to the NFC communication unit 32 of the portable terminal 3, an IP (Internet Protocol) address of the first MFP 2 and job specifying information specifying the user's print job (image data) that is stored in the RAM 23. When the NFC communication unit 32 of the portable terminal 3 receives the IP address and the job specifying information, the CPU 41 of the portable terminal 3 stores the IP address and the job specifying information in the RAM 43. It is noted that instead of the job specifying information, information specifying image data may be transmitted. It is necessary to transmit, to the portable terminal 3, at least information that specifies image data. However, it is unnecessary to transmit information other than the information specifying image data. This is because the user can set information other than the image data, such as the print condition, at the second MFP 2.

Next, when the NFC communication unit 32 of the portable terminal 3 is brought to a position close to the NFC communication unit 15 of the second MFP 2, NFC communication is established between the NFC communication unit 15 of the second MFP 2 and the NFC communication unit 32 of the portable terminal 3.

Then, the CPU 41 transmits, through the NFC communication from the NFC communication unit 32 of the portable terminal 3 to the NFC communication unit 15 of the second MFP 2, the IP address and the job specifying information that are stored in the RAM 43 of the portable terminal 3.

When the NFC communication unit 15 of the second MFP 2 receives the IP address and the job specifying information, the CPU 24 of the second MFP 2 requests, from the network communication unit 16 of the second MFP 2 to the network communication unit 16 of the first MFP 2 having the IP address, that network communication through the LAN 4 should be established. When network communication is established between the network communication unit 16 of the first MFP 2 and the network communication unit 16 of the second MFP 2, the CPU 24 of the second MFP 2 transmits, from the network communication unit 16 of the second MFP 2 to the network communication unit 16 of the first MFP 2, a request signal for transmission of image data and the job specifying information that has been received by the network communication unit 16 of the second MFP 2 from the NFC communication unit 32 of the portable terminal 3. When receiving the request signal, the CPU 24 of the first MFP 2 specifies image data by using the job specifying information. Then, the CPU 24 of the first MFP 2 transmits, from the network communication unit 16 of the first MFP 2 to the network communication unit 16 of the second MFP 2, the specified image data and a print condition corresponding to the specified image data.

When the network communication unit 16 of the second MFP 2 receives the image data, the CPU 24 of the second MFP 2 controls the image forming unit 11 to print images based on the image data and according to the print condition. It is noted that as described already, only image data may be transmitted from the first MFP 2 to the second MFP 2. In this case, a user can input the print condition through the operation unit 14 of the second MFP 2, thereby controlling the second MFP 2 to perform printing.

<First Communication Process>

Figure 5:
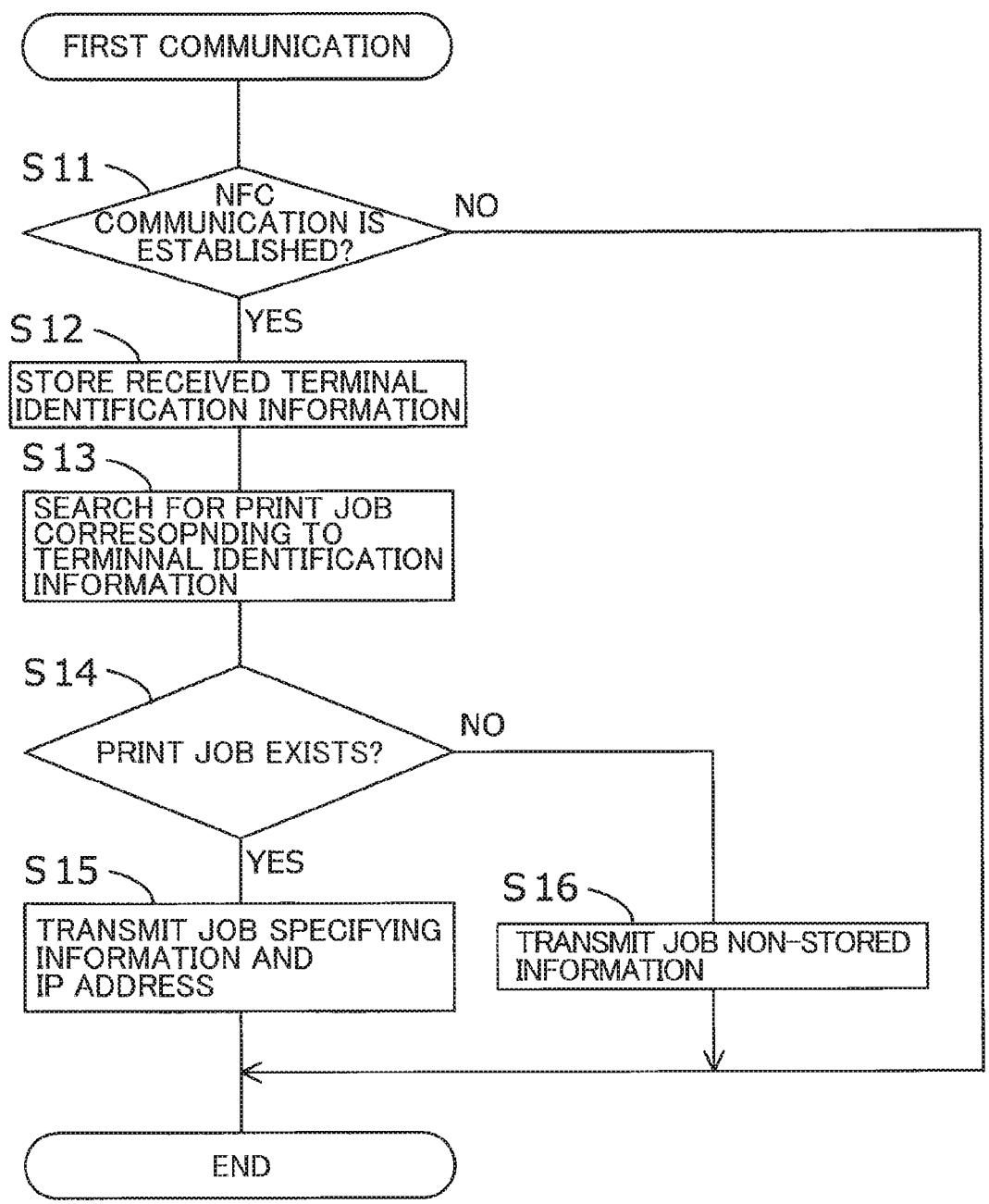
FIG. 5 is a flowchart of a first communication process performed by a first MFP according to the first embodiment.

In the first MFP 2, a first communication process illustrated in FIG. 5 is performed by the CPU 24. The first communication process is performed repeatedly at a predetermined period.

In the first communication process, the CPU 24 determines whether NFC communication is established between the NFC communication unit 15 and the NFC communication unit 32 of the portable terminal 3 (S11).

When NFC communication is not established (S11: NO), the CPU 24 ends the first communication process.

When the NFC communication unit 32 of the portable terminal 3 is brought to a position close to the NFC communication unit 15 and NFC communication is established between the NFC communication unit 15 and the NFC communication unit 32 of the portable terminal 3 (S11: YES), the NFC communication unit 15 receives terminal identification information unique to the portable terminal 3. The CPU 24 stores, in the RAM 23, the terminal identification information that is received by the NFC communication unit 15 (S12). Examples of the terminal identification information unique to the portable terminal 3 include: an IP address or an MAC (Media Access Control) address assigned to the portable terminal; and other identification information such as a production number of the portable terminal 3.

Thereafter, the CPU 24 searches for a print job corresponding to the terminal identification information (S13). For example, the RAM 23 includes an NVRAM. In the NVRAM, there is stored data of a correspondence relationship between a plurality of sets of terminal identification information and a plurality of user IDs. The CPU 24 identifies a user ID corresponding to the received terminal identification information by referring to the correspondence relationship stored in the NVRAM. Then, the CPU 24 searches for a print job that contains the identified user ID from among one or more print jobs stored in the RAM 23.

In a case where it is known from the results of the searches that a print job containing the identified user 1D is stored in the RAM 23 (S14: YES), the CPU 24 determines that the CPU 24, per se. is for the first MFP 2 and that the NFC communication unit 32 of the portable terminal 3 has been brought to a position close to the NFC communication unit 15 of the first MFP 2 for the purpose of acquiring job specifying information and the IP address of the first MFP 2. So, the CPU 24 extracts from the RAM 23 a print job containing the identified user ID. Then, the CPU 24 controls the NFC communication unit 15 to transmit the job specifying information associated with the extracted print job and the IP address of the first MFP 2 (S15). It is noted that when more than one print job each of which contains the identified user ID is stored in the RAM 23 (yes in S14), the CPU 24 extracts all of the more than one print job containing the user ID, and sends job specifying information that specify all of the extracted print jobs. Thereafter, the CPU 24 ends the first communication process.

On the other hand, in a case where it is known from the results of the searches that no print jobs containing the user ID are stored in the RAM 23 (S14: NO), the CPU 24 controls the NFC communication unit 15 to transmit, toward the NFC communication unit 32 of the portable terminal 3, job non-stored information indicating that no print jobs containing the user ID are stored in the RAM 23 (S16). Thereafter, the CPU 24 ends the first communication process.

<Second Communication Process>

Figure 6:
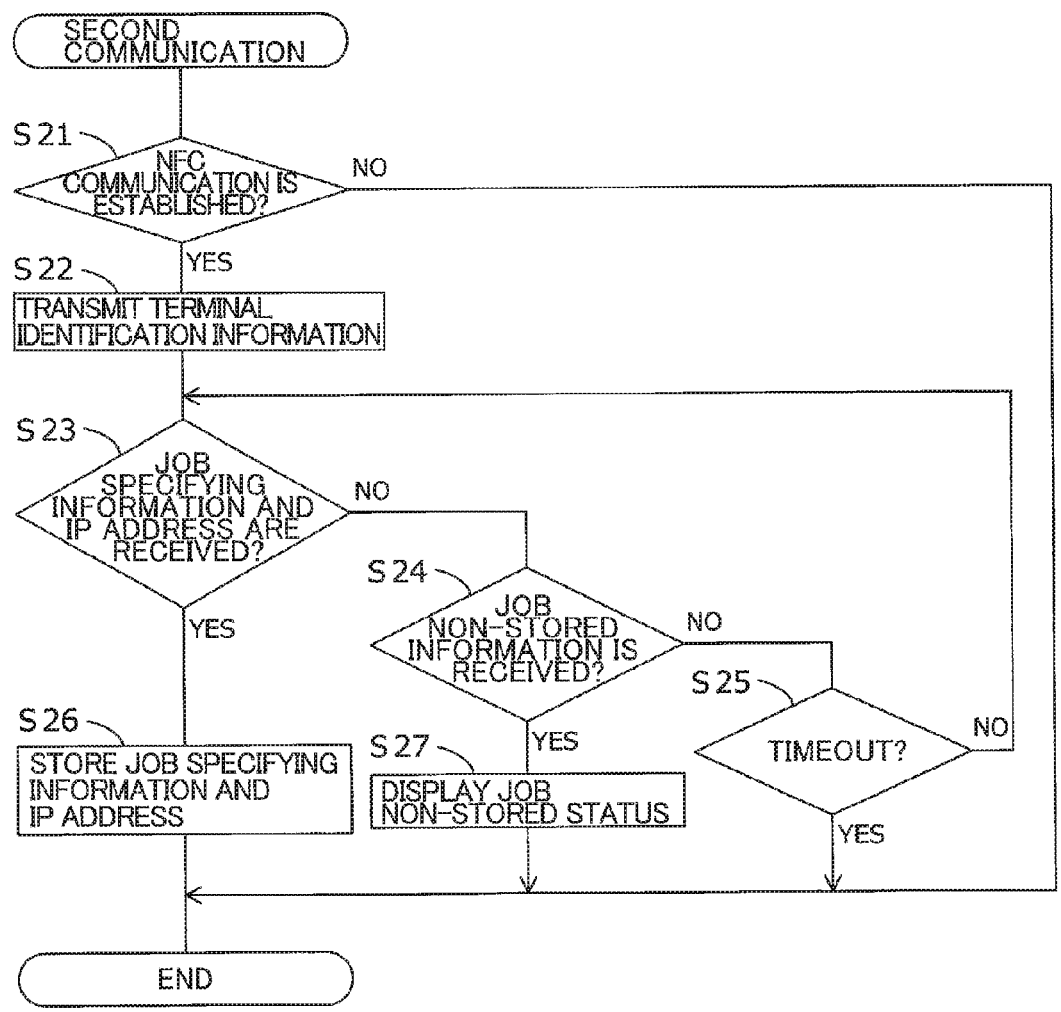
FIG. 6 is a flowchart of a second communication process performed by the portable terminal according to the first embodiment.

Concurrently with execution of the first communication process, the CPU 41 in the portable terminal 3 performs a second communication process illustrated in FIG. 6. The second communication process is performed repeatedly at a predetermined period.

In the second communication process, the CPU 41 determines whether NFC communication is established between the NFC communication unit 32 and the NFC communication unit 15 of the first MFP 2 (S21).

When NFC communication is not established (S21: NO), the CPU 41 ends the second communication process.

When the portable terminal 3 is brought to a position close to the NFC communication unit 15 of the first MFP 2 and NFC communication is established between the NFC communication unit 32 and the NFC communication unit 15 of the first MFP 2 (S21: YES), the CPU 41 controls the NFC communication unit 32 to transmit the terminal identification information unique to the portable terminal 3 toward the NFC communication unit 15 of the first MFP 2 (S22). Thereafter, the CPU 41 determines whether the NFC communication unit 32 has received job specifying information and the IP address of the first MFP 2 (S23).

When the NFC communication unit 32 has not received job specifying information or the IP address of the first MFP 2 (S23: NO), the CPU 41 determines whether the NFC communication unit 32 has received job non-stored information (S24).

When the NFC communication unit 32 has not received job specifying information or the IP address of the first MFP 2 and also has not received job non-stored information (S24: NO), the CPU 41 determines whether a predetermined length of time has elapsed after the NFC communication was established (S25).

When the predetermined length of time has not yet elapsed after establishment of the NFC communication (S25: NO), the CPU 41 determines again whether the NFC communication unit 32 has received job specifying information and the IP address of the first MFP 2 (S23).

When the NFC communication unit 32 receives job specifying information and the IP address of the first MFP 2 before the predetermined length of time is elapsed after establishment of the NFC communication (S23: YES), the CPU 41 stores, in the RAM 43, the job specifying information and the IP address of the first MFP 2 which are received by the NFC communication unit 32 (S26). Thereafter, the CPU 41 ends the second communication process.

When the NFC communication unit 32 receives job non-stored information before the predetermined length of time is elapsed after establishment of the NFC communication (S24: YES), the CPU 41 controls the display unit 31 to display, in a screen of the display unit 31, a status that no print jobs for the user are stored in the first MFP 2 (S27). Thereafter, the CPU 41 ends the second communication process.

When the predetermined length of time has elapsed after establishment of the NFC communication, but the NFC communication unit 32 has not received job specifying information, the IP address of the first MFP 2, or job non-stored information (S23: NO, S24: NO, 525: YES), the CPU 41 ends the second communication process as a timeout error.

<Third Communication Process>

Figure 7:
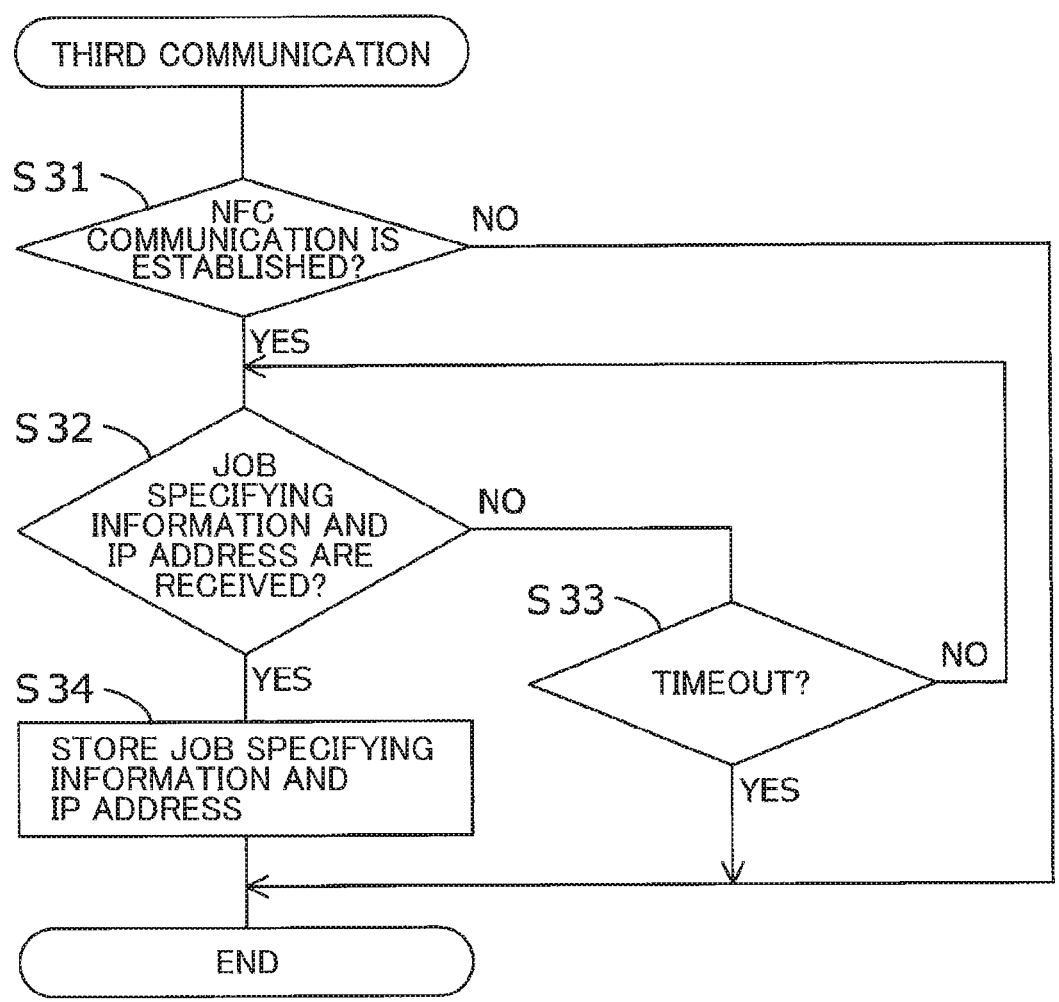
FIG. 7 is a flowchart of a third communication process performed by a second MFP according to the first embodiment.

In the second MFP 2, a third communication process illustrated in FIG. 7 is performed by the CPU 24. The third communication process is performed repeatedly at a predetermined period.

In the third communication process, the CPU 24 determines whether NFC communication is established between the NFC communication unit 15 and the NFC communication unit 32 of the portable terminal 3 (S31).

When NFC communication is not established (S31: NO), the CPU 24 ends the third communication process.

When the portable terminal 3 is brought to a position close to the NFC communication unit 15 of the second MFP 2 and NFC communication is established between the NFC communication unit 15 and the NFC communication unit 32 of the portable terminal 3 (S31: YES), the CPU 24 determines whether the NFC communication unit 15 has received job specifying information and the IP address of the first MFP 2 (S32). It is noted that the portable terminal 3 does not send the terminal identification information in the third communication process, in contrast to the first communication process. Therefore, the NFC communication unit 15 of the second MFP 2 does not receive the terminal identification information.

When the NFC communication unit 15 has not received job specifying information or the IP address of the first MFP 2 (S32: NO), the CPU 24 determines whether a predetermined length of time has elapsed after NFC communication was established (S33).

When the predetermined length of time has not yet elapsed after establishment of the NFC communication (S33: NO), the CPU 24 determines again whether the NFC communication unit 15 has received job specifying information and the IP address of the first MFP 2 (S32).

When the NFC communication unit 15 receives job specifying information and the IP address of the first MFP 2 before the predetermined length of time is elapsed after establishment of the NFC communication (S32: YES), the CPU 24 stores, in the RAM 23, the job specifying information and the IP address of the first MFP 2 that are received by the NFC communication unit 15 (S34). Thereafter, the CPU 41 ends the second communication process.

When the predetermined length of time has elapsed after establishment of the NFC communication, but the NFC communication unit 15 has not received job specifying information or the IP address of the first MFP 2 (S32: NO, S33: YES), the CPU 24 ends the third communication process as a timeout error.

<Fourth Communication Process>

Figure 8:
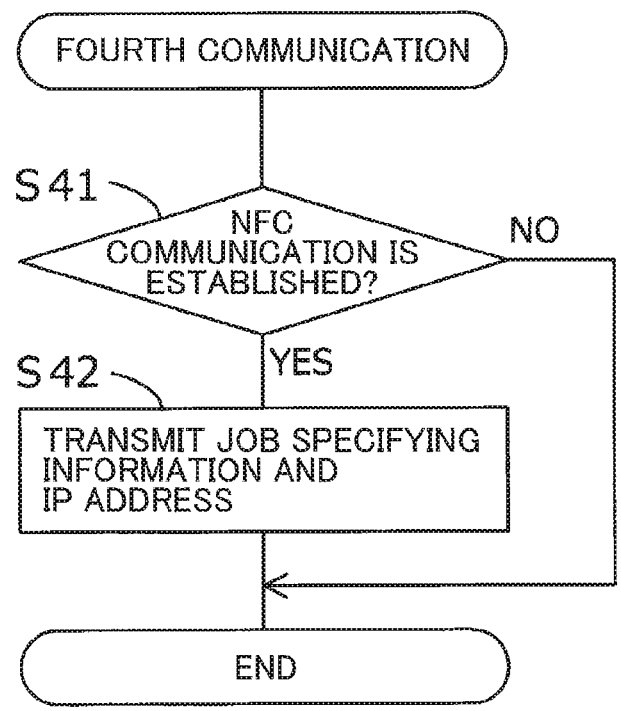
FIG. 8 is a flowchart of a fourth communication process performed by the portable terminal according to the first embodiment.

Concurrently with execution of the third communication process, the CPU 41 in the portable terminal 3 performs a fourth communication process illustrated in FIG. 8. The fourth communication process is performed repeatedly at a predetermined period.

In the fourth communication process, the CPU 41 determines whether NFC communication is established between the NFC communication unit 32 and the NFC communication unit 15 of the second MFP 2 (S41).

When NFC communication is not established (S41: NO), the CPU 41 ends the fourth communication process.

When the portable terminal 3 is brought to a position close to the NFC communication unit 15 of the second MFP 2 and NFC communication is established between the NFC communication unit 32 and the NFC communication unit 15 of the second MFP 2 (S41: YES), the CPU 41 controls the NFC communication unit 32 to transmit, toward the NFC communication unit 15 of the second MFP 2, the IP address of the first MFP 2 and the job specifying information which are stored in the RAM 43 (S42). Thereafter, the CPU 41 ends the fourth communication process.

<Fifth Communication Process>

Figure 9:
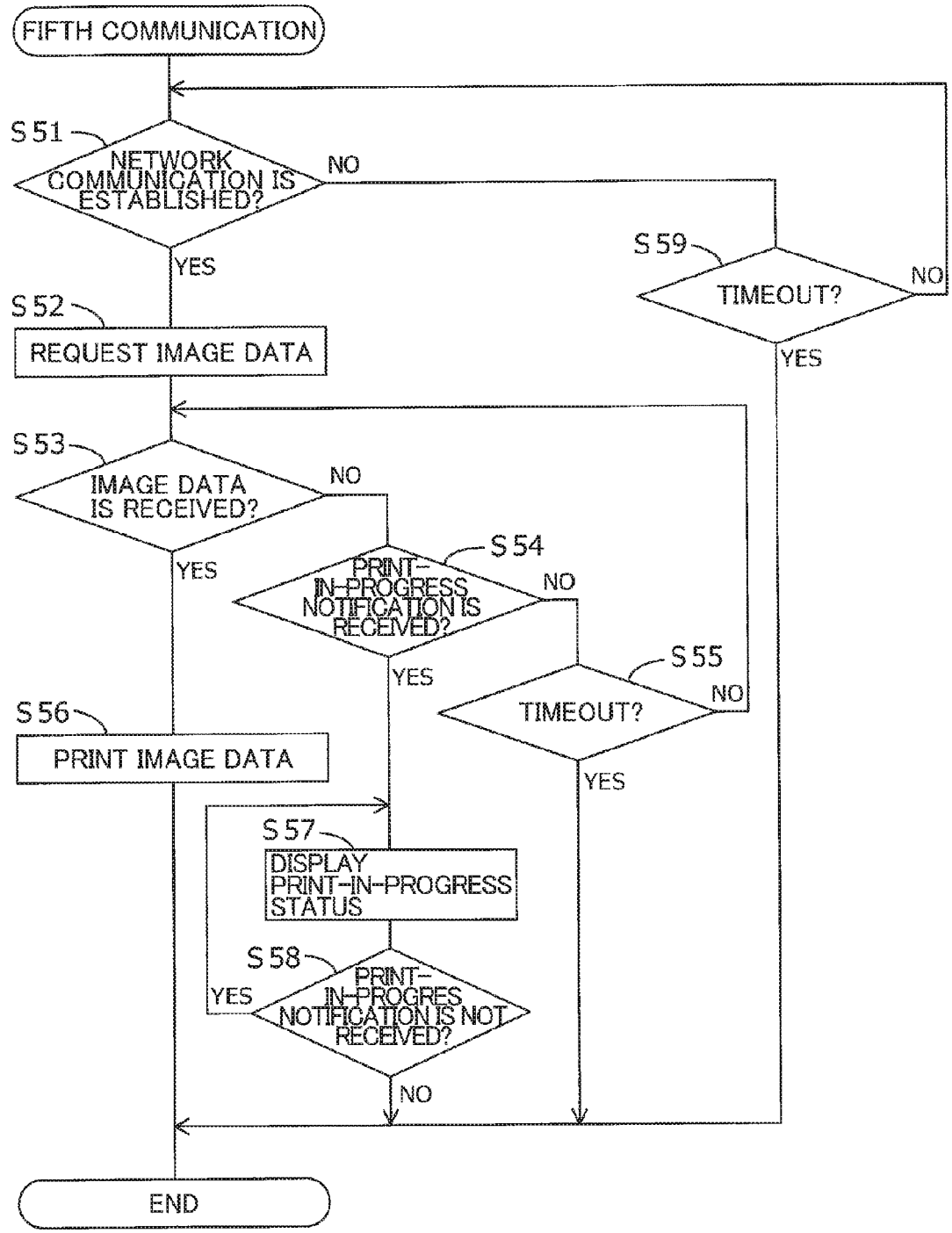
FIG. 9 is a flowchart of a fifth communication process performed by the second MFP according to the first embodiment.

In the second MFP 2, the CPU 24 performs a fifth communication process illustrated in FIG. 9. The CPU 24 starts performing the fifth communication process when the NFC communication unit 15 in the second MPF 2 receives job specifying information and the IP address of the first MFP 2 in the third communication process.

In the fifth communication process, the CPU 24 controls the network communication unit 16 to request the first MFP 2, which has an IP address the same as the IP address stored in the RAM 23, to establish network communication with the second MFP 2 through the LAN 4.

When the first MFP 2 responds to the request and network communication is established between the first MFP 2 and the second MFP 2 (S51: YES), the CPU 24 in the second MFP 2 controls the network communication unit 16 to transmit: a transmission request signal requesting transmission of image data; and the job specifying information that is stored in the RAM 23 of the second MFP 2 (S52).

Thereafter, the CPU 24 determines whether the network communication unit 16 has received image data whose transmission was requested by the transmission request signal (S53).

When the network communication unit 16 has not received image data (S53: NO), the CPU 24 determines whether the network communication unit 16 has received a print-in-progress notification indicating that the first MFP 2 is performing the print job (S54).

When the network communication unit 16 has not received image data or the print-in-progress notification (S54: NO), the CPU 24 determines whether a predetermined length of time has elapsed after transmission of image data was requested (S55).

When the predetermined length of time has not yet elapsed after the request for the transmission of the image data (S55: NO), the CPU 24 determines again whether the network communication unit 16 has received image data (S53).

When the network communication unit 16 receives image data before the predetermined length of time is elapsed after the request for the transmission of the image data (yes in S53), the CPU 24 stores the received image data in the RAM 23, and controls the image forming unit 11 to print images on sheets based on the image data (S56). Because the image data is added with a print condition corresponding to the image data, the image forming unit 11 forms images on the sheets based on the image data and according to the print condition. Thereafter, the CPU 24 ends the fifth communication process.

When the network communication unit 16 receives the print-in-progress notification before the predetermined length of time is elapsed after the request for the transmission of the image data (S54: YES), the CPU 24 controls the display unit 13 to display, in the screen of the display unit 13, a status that the first MFP 2 is printing images based on the image data (S57).

As will be descried later, the first MFP 2 sends the print-in-progress notification repeatedly at a constant period until the first MFP 2 ends the printing. When the network communication unit 16 does not receive the print-in-progress notification any more (S58: NO), the CPU 24 controls the display unit 13 to delete the displayed indication indicating that the first MFP 2 is performing the print job. Thereafter, the CPU 24 ends the fifth communication process.

On the other hand, when the predetermined length of time has elapsed after the request for the transmission of image data, but the network communication unit 16 in the second MFP 2 has not received image data or the print-in-progress notification (S53: NO, S54: NO, S55: YES), the CPU 24 ends the fifth communication process as a timeout error.

When the predetermined length of time has elapsed after establishment of network communication was requested, but network communication has not been established between the first MFP 2 and the second MFP 2 (S51: NO, S59: YES), the CPU 24 ends the fifth communication process as a timeout error.

<Sixth Communication Process>

Figure 10:
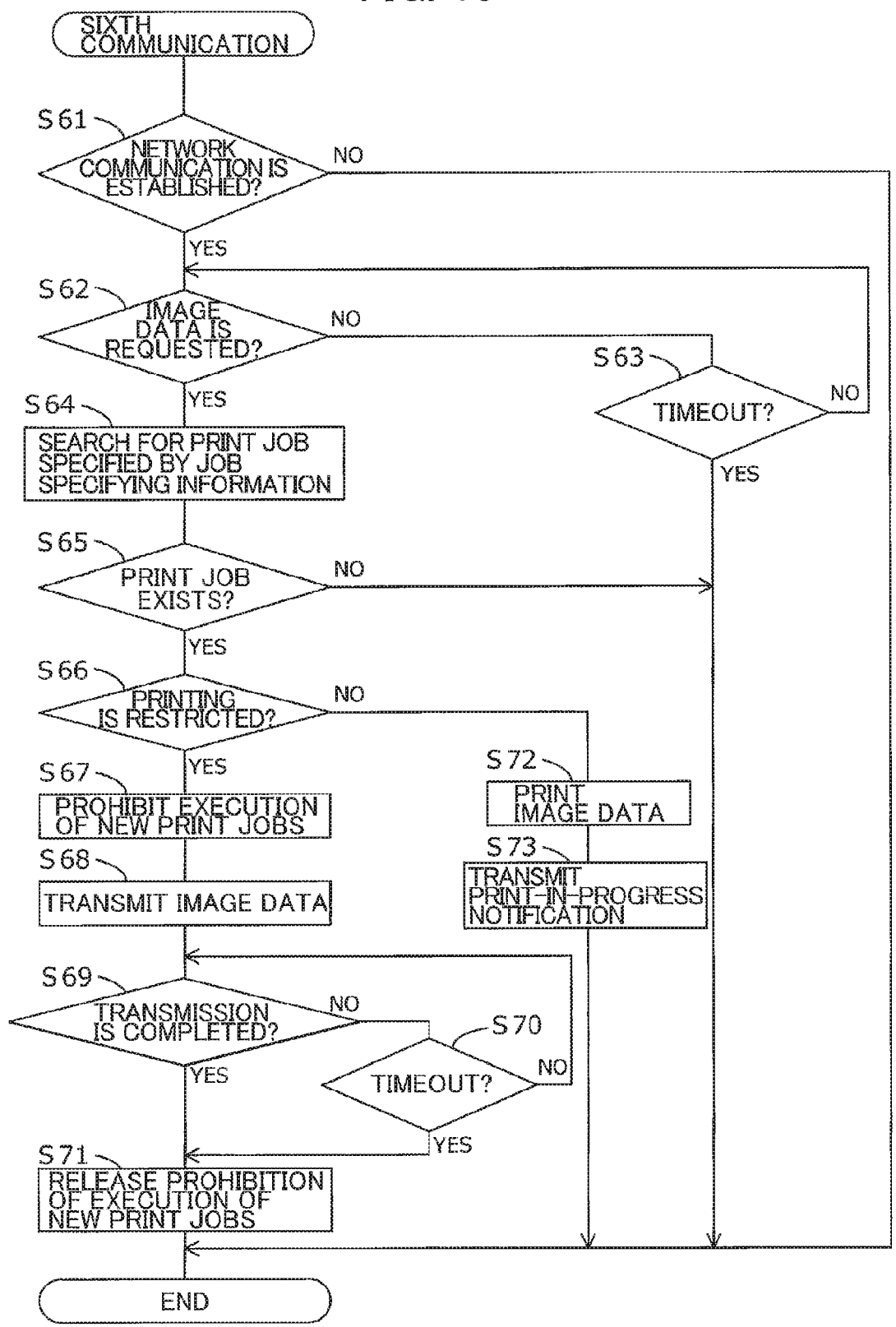
FIG. 10 is a flowchart of a sixth communication process performed by the first MFP according to the first embodiment.

Concurrently with execution of the fifth communication process, the CPU 24 in the first MFP 2 performs a sixth communication process illustrated in FIG. 10. The sixth communication process is performed repeatedly at a predetermined period.

In the sixth communication process, the CPU 24 performs a process of establishing network communication through the LAN 4 in response to the request for establishment of network communication that was transmitted from the network communication unit 16 of the second MFP 2 and received by the network communication unit 16 of the first MFP 2. Then, the CPU 24 determines whether network communication has been established between the network communication unit 16 and the network communication unit 16 of the second MFP 2 through the LAN 4 (S61).

When network communication is not established (S61: NO), the CPU 24 ends the sixth communication process.

When network communication is established between the first MFP 2 and the second MFP 2 (S61: YES), the CPU 24 determines whether the network communication unit 16 has received a request for transmission of image data, that is, a transmission request signal for transmission of image data and job specifying information (S62).

When the network communication unit 16 has not received a transmission request signal or job specifying information (S62: NO), the CPU 24 determines whether the predetermined length of time has elapsed after establishment of the network communication (S63).

When the predetermined length of time has not yet elapsed after establishment of the network communication (S63: NO), the CPU 24 determines again whether the network communication unit 16 has received a transmission request signal and job specifying information (S62).

When the network communication unit 16 receives a transmission request signal and job specifying information before the predetermined length of time elapses after the network communication was established (S62: YES), the CPU 24 searches for a print job that is specified by the received job specifying information among the print jobs stored in the RAM 23 (S64).

In a case where it is known from the results of the searches that a print job specified by the job specifying information is stored in the RAM 23 (S65: YES), the CPU 24 in the first MFP 2 determines whether the image forming unit 11 is presently being restricted from printing images based on image data of the specified print job (S66).

In a case where an error occurs in the image forming unit 11 or the image forming unit 11 is presently performing printing for another user, and therefore the image forming unit 11 is unable to immediately start executing the specified print job (S66: YES), the CPU 24 prohibits the image forming unit 11 from performing new print jobs that will be newly requested (S67).

Then, the CPU 24 in the first MFP 2 controls the network communication unit 16 to transmit the print condition and the image data which are contained in the print job specified by the job specifying information (868).

Thereafter, the CPU 24 determines whether transmission of the image data and the print condition is completed (S69). Determination on whether transmission of the image data and the print condition is completed is repeatedly performed until a predetermined length of time is elapsed after transmission of the image data and the print condition started.

When transmission of the image data and the print condition is completed before the predetermined length of time is elapsed after transmission of the image data and the print condition started (869: YES), the CPU 24 releases prohibition of execution of new print jobs by the image forming unit 11 so that the image forming unit 11 is enabled to execute new print jobs (S71), and ends the sixth communication process.

On the other hand, when the predetermined length of time is elapsed after transmission of the image data and the print condition started, but transmission of the image data and the print condition has not yet been completed (S69: NO, S70: YES), the CPU 24 in the first MFP 2 releases prohibition of execution of new print jobs by the image forming unit 11 (S71), and ends the sixth communication process as a timeout error.

On the other hand, when the image forming unit 11 is not restricted from printing and can immediately perform printing for the print job stored in the RAM 23 (S66: NO), the CPU 24 in the first MFP 2 controls the image forming unit 11 to print the image data contained in the print job according to the print condition corresponding to the image data (S72).

Then, the CPU 24 controls the network communication unit 16 to perform a print-in-progress notification notifying the network communication unit 16 of the second MFP 2 a status that the image forming unit 11 in the first MFP 2 is performing the print job (S73). The print-in-progress notification is sent to the second MFP 2 repeatedly at the constant period until the image forming unit 11 ends the print job. Then, when the print job is ended, the CPU 24 ends the sixth communication process.

When the predetermined time elapses after establishment of the network communication between the first MFP 2 and the second MFP 2, but the network communication unit 16 has not received a transmission request signal or job specifying information (S62: NO, S63: YES), the CPU 24 ends the sixth communication process as a timeout error.

<Operational Advantages>

As described above, image data can be transferred from the first MFP 2 to the second MFP 2 by executing NFC communication two times, that is, between the first MFP 2 and the portable terminal 3 and between the second MFP 2 and the portable terminal 3. Then, based on the image data, images can be formed on the sheets by the image forming unit 11 of the second MFP 2.

Therefore, it is unnecessary to set, to the first MFP 2, positional information of the second MFP 2 which is a transfer destination. Image data can be transferred from the first MFP 2 to the second MFP 2 by a user simply operating the portable terminal 3 to perform NFC communication between the portable terminal 3 and the first MFP 2 and perform NFC communication between the portable terminal 3 and the second MFP 2.

The first MFP 2 and the second MFP 2 each are provided with the network communication unit 16 which can perform network communication at a communication rate higher than the NFC communication. Image data is transferred from the network communication unit 16 of the first MFP 2 to the network communication of the second MFP 2 through network communication. Therefore, even when the amount of image data is relatively large, the image data can be reliably transferred from the first MFP 2 to the second MFP 2.

In a case where the image forming unit 11 of the first MFP 2 can perform printing for the print job, the first MFP 2 performs the print job. That is, image data contained in the print job is printed by the image forming unit 11 of the first MFP 2. On the other hand, in a case where the image forming unit 11 of the first MFP 2 is restricted from printing, the image data is transferred from the first MFP 2 to the second MFP 2. Therefore, the user can obtain, at the second MFP 2, those sheets printed with the image data.

Even if the image forming unit 11 of the first MFP 2 is restricted from printing, the image forming unit 11 will possibly become capable of printing after NFC communication is established between the portable terminal 3 and the first MFP 2 and before image data starts being transmitted from the first MFP 2 to the second MFP 2. An example of such a case is that it takes a relatively long period of time for a user to find out a second MFP 2 that can print images based on the image data.

In a case where the image forming unit 11 of the first MFP 2 becomes capable of printing the image data before the image data starts being transmitted from the first MFP 2 to the second MFP 2, the image data is printed by the image forming unit 11 of the first MFP 2. Therefore, in a case where it takes a long time for a user to find out a second MFP 2 that can perform printing, the user can obtain, at the first MFP 2, sheets printed with images based on the image data.

In this case, when the user finds out a second MFP 2 that can form images and performs NFC communication between the portable terminal 3 and the second MFP 2, the display unit 13 of the second MFP 2 displays a status that the first MFP 2 is presently printing the image data. This allows the user to recognize that he/she can obtain, at the first MFP 2, sheets formed with the images based on the image data.

While image data is being transmitted from the first MFP 2 to the second MFP 2, even when the image forming unit 11 becomes capable of printing, the image forming unit 11 does not start performing new print jobs until transmission of the image data is completed. This ensures that the image forming unit 11 of the first MFP 2 does not print other image data in priority to the image data that is being transmitted to the second MFP 2.

When NFC communication is performed between the portable terminal 3 and the first MFP 2, the terminal identification information unique to the portable terminal 3 is acquired by the first MFP 2. Data of the correspondence relationship between the plural sets of terminal identification information and the plural user IDs is stored in the RAM 23 of the first MFP 2. The first MFP 2 identifies a user ID corresponding to the acquired terminal identification information, and searches for a print job containing the identified user ID.

In a case where a print job containing the identified user ID is stored in the RAM 23, the first MFP 2 transmits, to the portable terminal 3, information necessary for transferring image data of the print job from the first MFP 2 to the second MFP 2, that is, the job specifying information specifying the print job and the IP address of the first MFP 2.

On the other hand, in a case where it is known from the results of the searches that a print job containing the identified user ID is not stored in the RAM 23, the first MFP 2 sends job non-stored information indicating that status to the portable terminal 3, but does not send to the portable terminal 3 information necessary for transferring image data from the first MFP 2 to the second MFP 2. This configuration ensures that image data contained in those print jobs that are not associated with the terminal identification information of the portable terminal 3 is not transferred from the first MFP 2 to the second MFP 2.

When the portable terminal 3 receives job non-stored information, the portable terminal 3 displays, in the screen of the display unit 31, the status that print jobs for the user are not stored in the first MFP 2. Therefore, the user can recognize that print jobs for the user are stored in the first MFP 2.

<Modifications>

In the above-described embodiment, after the job specifying information and the IP address are transmitted from the NFC communication unit 15 of the first MFP 2 to the NFC communication unit 32 of the portable terminal 3, the job specifying information and the IP address are transmitted from the NFC communication unit 32 of the portable terminal 3 to the NFC communication unit 15 of the second MFP 2.

However, after the job specifying information and the IP address are transmitted from the NFC communication unit 15 of the first MFP 2 to the NFC communication unit 32 of the portable terminal 3, in S26 (FIG. 6), the CPU 41 of the portable terminal 3 may generate job specifying information that is different from the received job specifying information and generate communication setting information that is different from the received IP address, and store the generated job specifying information and communication setting information in the RAM 43. The NFC communication unit 32 of the portable terminal 3 transmits the generated job specifying information and communication setting information to the NFC communication unit 15 of the second MFP 2.

The job specifying information generated by the CPU 41 is such information that can specify the contents of the job specifying information received by the NFC communication unit 32 of the portable terminal 3. For example, in a case where the received job specifying information is the job number, an example of the job specifying information generated by the CPU 41 is a storage address and a size of job data that is identified by the job number.

The communication setting information generated by the CPU 41 is such information that can specify the IP address received by the NFC communication unit 32 of the portable terminal 3. An example of the communication setting information generated by the CPU 41 is resultant information that is obtained by adding additional information to the received IP address.

In the above-described embodiment, the first MFP 2 actively operates, and the portable terminal 3 passively operates in the communication between the first MFP 2 and the portable terminal 3. In other words, when NFC communication is established between the first MFP 2 and the portable terminal 3, the first MFP 2 transmits the job specifying information and the IP address of the first MFP 2 to the portable terminal 3.

Figure 11A:
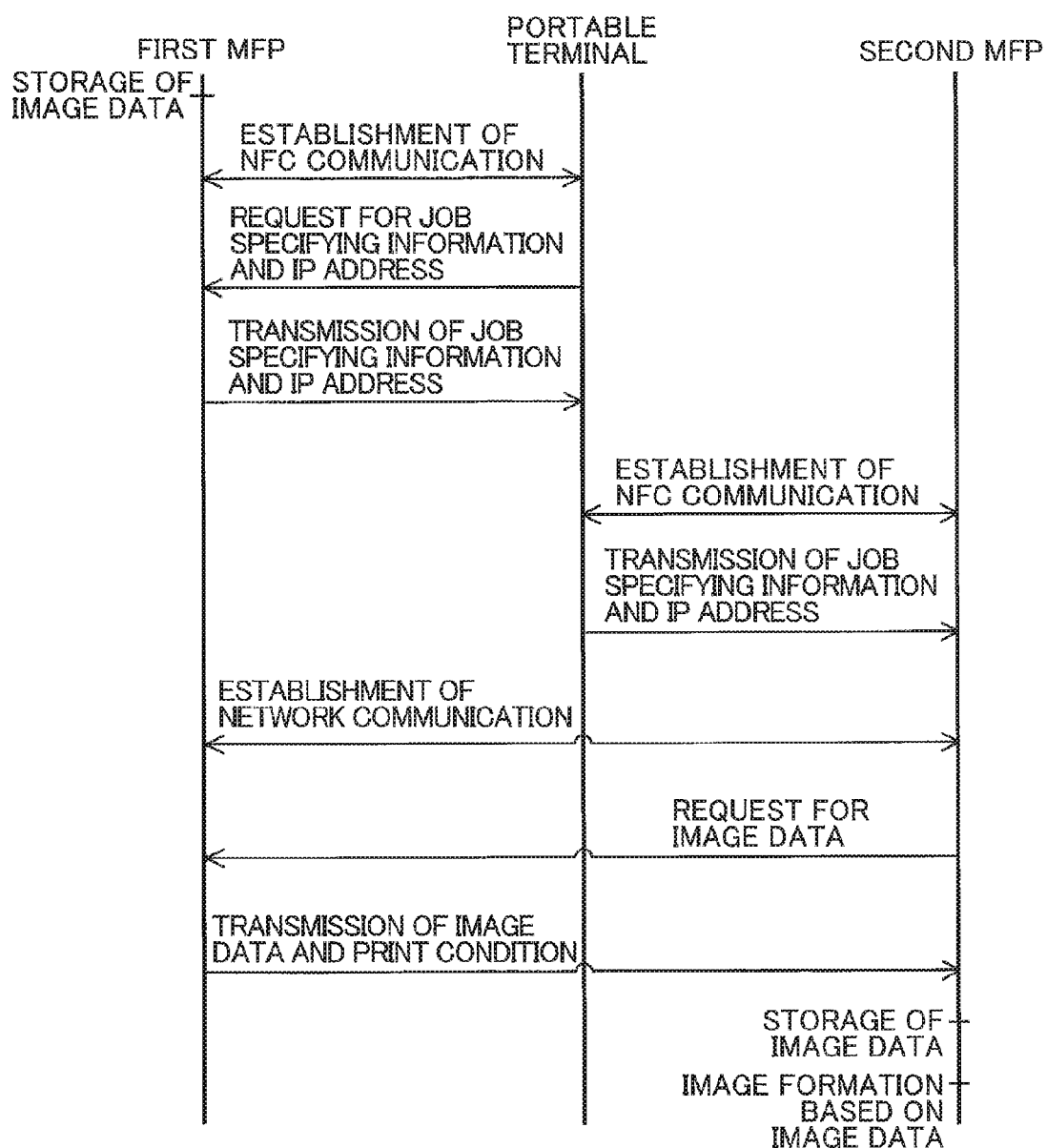
FIG. 11A illustrates communication performed in the image forming system shown in FIG. 1 according to a modification of the first embodiment.

However, the portable terminal 3 may actively operate and the first MFP 2 may passively operate in the communication between the first MFP 2 and the portable terminal 3. For example, in the sequence illustrated in FIG. 11A, when NFC communication is established between the first MFP 2 and the portable terminal 3, the portable terminal 3 requests the first MFP 2 to send to the portable terminal 3 the job specifying information and the IP address of the first MFP 2. In response to the request, the first MFP 2 sends, to the portable terminal 3, the job specifying information and the IP address of the first MFP 2.

Embodiments described later are also related to an example in which the first MFP 2 actively operates and the portable terminal 3 passively operates in the communication between the first MFP 2 and the portable terminal 3. However, the portable terminal 3 may actively operate, and the first MFP 2 and the second MFP 2 may passively operate in the embodiments described later.

Next will be described with reference to FIG. 11B a first modification of the first communication process executed by the first MFP 2. Common processes between the first communication process in the first embodiment and the first communication process in the first modification will not be repeatedly described for the sake of simplicity.

In the first communication process of the first embodiment shown in FIG. 5, when at least one print job containing the identified user ID is stored in the RAM 23 (yes in S14), the CPU 24 extracts all of the at least one print job containing the user ID, and sends job specifying information specifying all of the extracted print job and the IP address of the first MFP 2 to the second MFP 2.

However, according to the first modification, when the RAM 23 stores therein at least one print job containing the user ID (yes in S14), the CPU 24 further judges in SI 11 whether or not the at least one print job containing the user ID includes at least one print job for which printing by the image forming unit 11 is not completed. That is, the CPU 24 judges whether the at least one print job containing the user ID includes at least one print job for which the image forming unit 11 has not yet started printing, or for which the image forming unit 11 has already started printing but has not yet completed printing. When the at least one print job containing the user ID includes at least one print job for which printing by the image forming unit 11 is not completed (yes in S111), the CPU 24 extracts the at least one print job for which printing by the image forming unit 11 is not completed. Then, in S112, the CPU 24 controls the NFC communication unit 15 to transmit, to the second MFP 2, job specifying information specifying the extracted print job and the IP address of the first MFP 2. It is noted that the CPU 24 in the first MFP 2 performs both of the first communication process shown in FIG. 11A and the sixth communication process shown in FIG. 10.

Figure 11B:
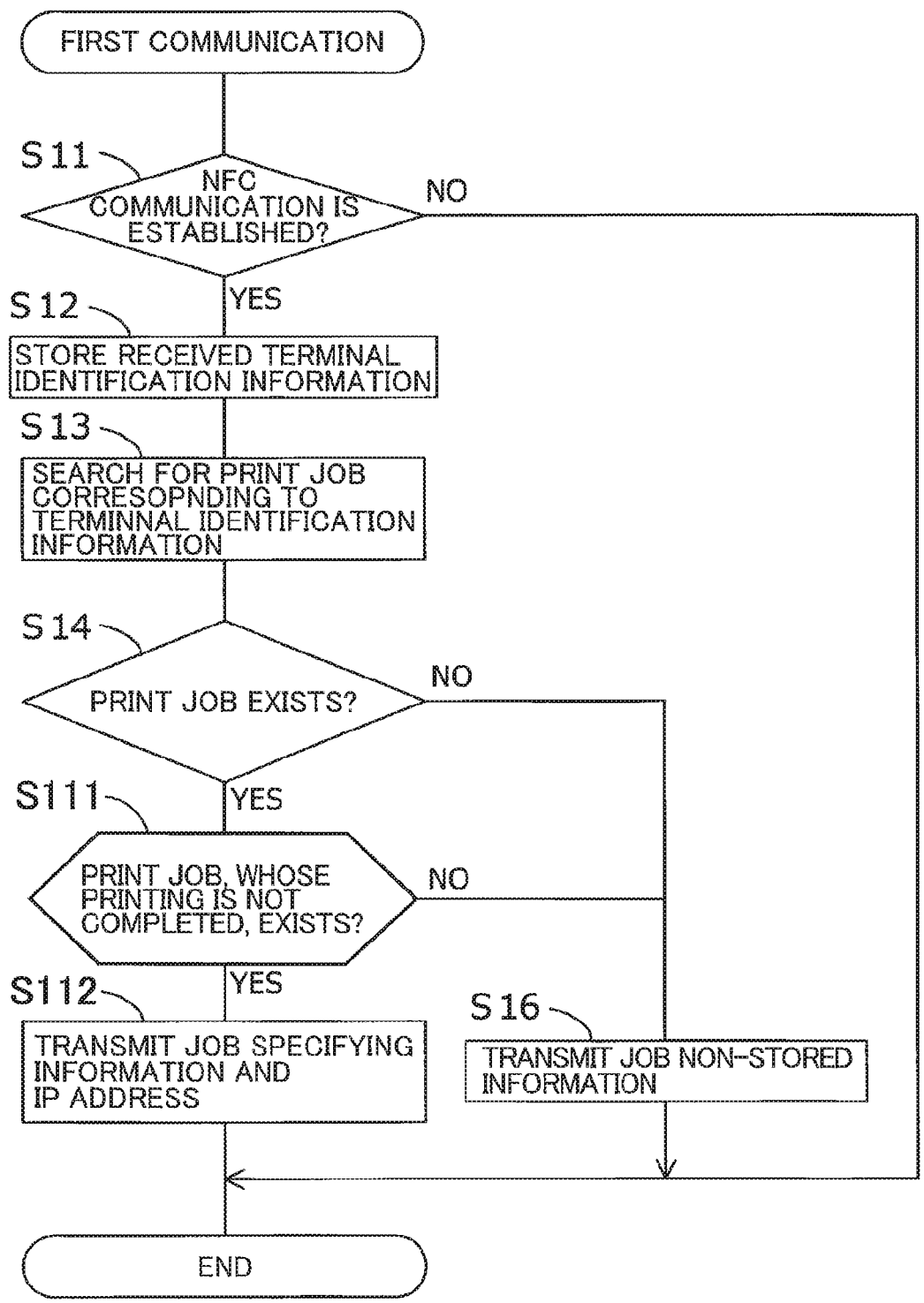
FIG. 11B is a flowchart of a first modification of the first communication process shown in FIG. 5.
Figure 11C:
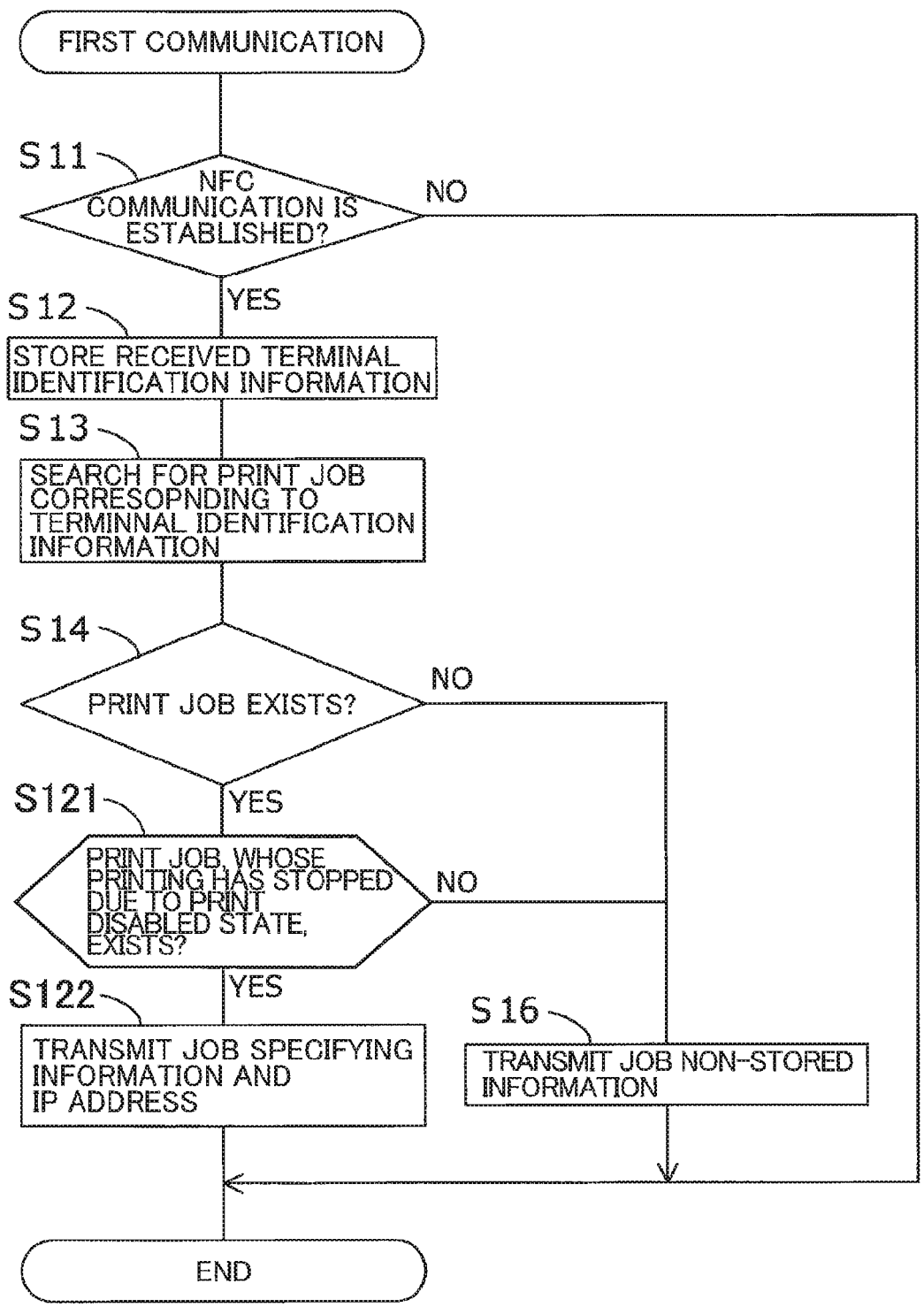
FIG. 11C is a flowchart of a second modification of the first communication process shown in FIG. 5.

A second modification of the first communication process is illustrated in FIG. 11C. Common processes between the first communication process in the first embodiment and the first communication process in the second modification will not be repeatedly described for the sake of simplicity.

In the second modification, as shown in FIG. 11C, when at least one print job containing the user ID is stored in the RAM 23 (yes in S14), the CPU 24 further judges in S121 whether or not the at least one print job containing the user ID includes at least one print job for which the image forming unit 11 has stopped printing in the middle of printing due to entering of the image forming unit 11 into a print disable state. It is noted that the image forming unit 11 may stop printing in the middle of printing when the image forming unit 11 is brought into the print disabled state and becomes incapable of performing printing in the middle of printing. Examples of the case where the image forming unit 11 is brought into the print disabled state include a case that an error occurs in the image forming unit 11. When the at least one print job containing the user ID includes at least one print job for which the image forming unit 11 has stopped printing in the middle of printing due to the print disabled state (yes in S121), the CPU 24 extracts the at least one print job for which the image forming unit 11 has stopped printing in the middle of printing. Then, in S122, the CPU 24 controls the NFC communication unit 15 to transmit job specifying information specifying the extracted print job and the IP address of the second MFP 2. It is noted that the CPU 24 in the first MFP 2 performs both of the first communication process shown in FIG. 11C and the sixth communication process shown in FIG. 10.

It is also noted that when extracting the print job for which the image forming unit 11 has stopped printing, the CPU 24 may extract both of: part of image data that has already been printed in the print job; and remaining part of the image data that has not been printed in the print job, and specify the extracted entire parts of the image data as a print job. Or, the CPU 24 may extract only the part of the image data that has not been printed in the print job, and specify only the extracted part of image data as a print job. In the case where the CPU 24 extracts only the part of the image data that has not been printed in the print job, in S122, the CPU 24 transmits, as job specifying information, such information that specifies only the extracted, unprinted part of the image data. Accordingly, in the case where execution of a print job is stopped in the middle of the execution of the print job and then NFC communication is performed between the NFC communication unit 32 of the portable terminal 3 and the NFC communication unit 15 of the first MFP 2, the CPU 24 of the first MFP 2 transmits, from the network communication unit 16 of the first MFP 2 to the network communication unit 16 of the second MFP 2, the print condition and image data only for a portion of the print job that has not been executed, that is, a portion of image data for unprinted pages. Images already formed on the sheets by the first MFP 2 can be prevented from being formed again on the sheets by the second MFP 2. Therefore, unnecessary printing can be prevented.

<Second Embodiment>

Figure 12:
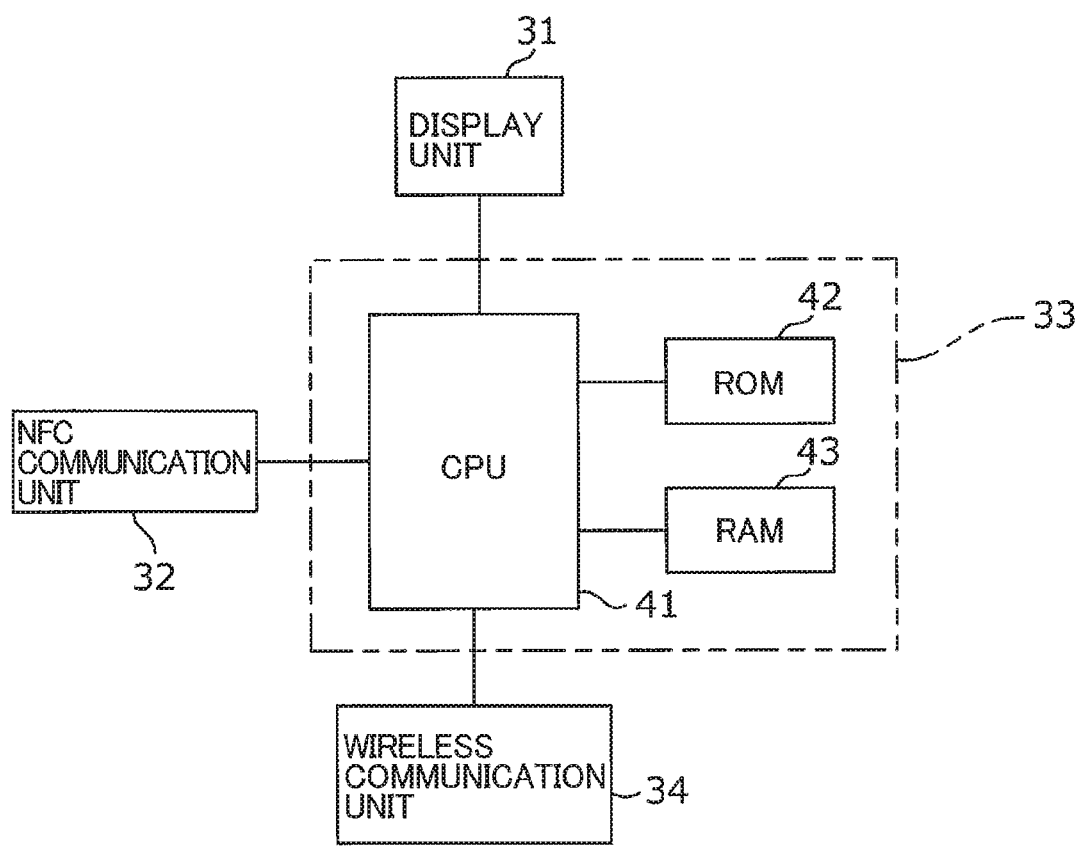
FIG. 12 is a block diagram showing an essential part of an electric configuration of a portable terminal according to a second embodiment.

In an image forming system 1 according to a second embodiment, the portable terminal 3 is configured as illustrated in FIG. 12 instead of the configuration illustrated in FIG. 3. In the configuration illustrated in FIG. 12, the portable terminal 3 has a wireless communication unit 34 in addition to the NFC communication unit 15. The wireless communication unit 34 is configured to perform wireless communication in accordance with a wireless communication standard other than the NFC communication standard, such as the Wi-Fi (registered trademark) standard or the Bluetooth (registered trademark) standard. Each MFP 2 is configured in correspondence with the above-described configuration of the portable terminal 3. More specifically, the network communication unit 16 in each MFP 2 is configured to perform wireless communication under the Wi-Fi (registered trademark) standard. Or, each MFP 2 may be added with a wireless communication unit for performing wireless communication under the Bluetooth (registered trademark) standard. Or, each MFP 2 may be configured such that each MFP 2 is added with the wireless communication unit for performing wireless communication under the Bluetooth (registered trademark) standard and that the network communication unit 16 is configured to perform wireless communication under the Wi-Fi (registered trademark) standard.

The following description will be given for an example in which the network communication unit 16 of each MFP 2 is configured to perform wireless communication under the Wi-Fi (registered trademark) standard, and wireless communication can be performed between the network communication unit 16 and the wireless communication unit 34 of the portable terminal 3. Common configurations and processes between the first embodiment and the second embodiment will not be repeatedly described for the sake of simplicity.

<Outline of Communication>

In the image forming system 1 according to the second embodiment, in a case where a print job cannot be executed immediately after the print job is stored in the RAM 23 of the first MFP 2, the print job can be performed by the second MFP 2 according to the following sequence.

Figure 13:
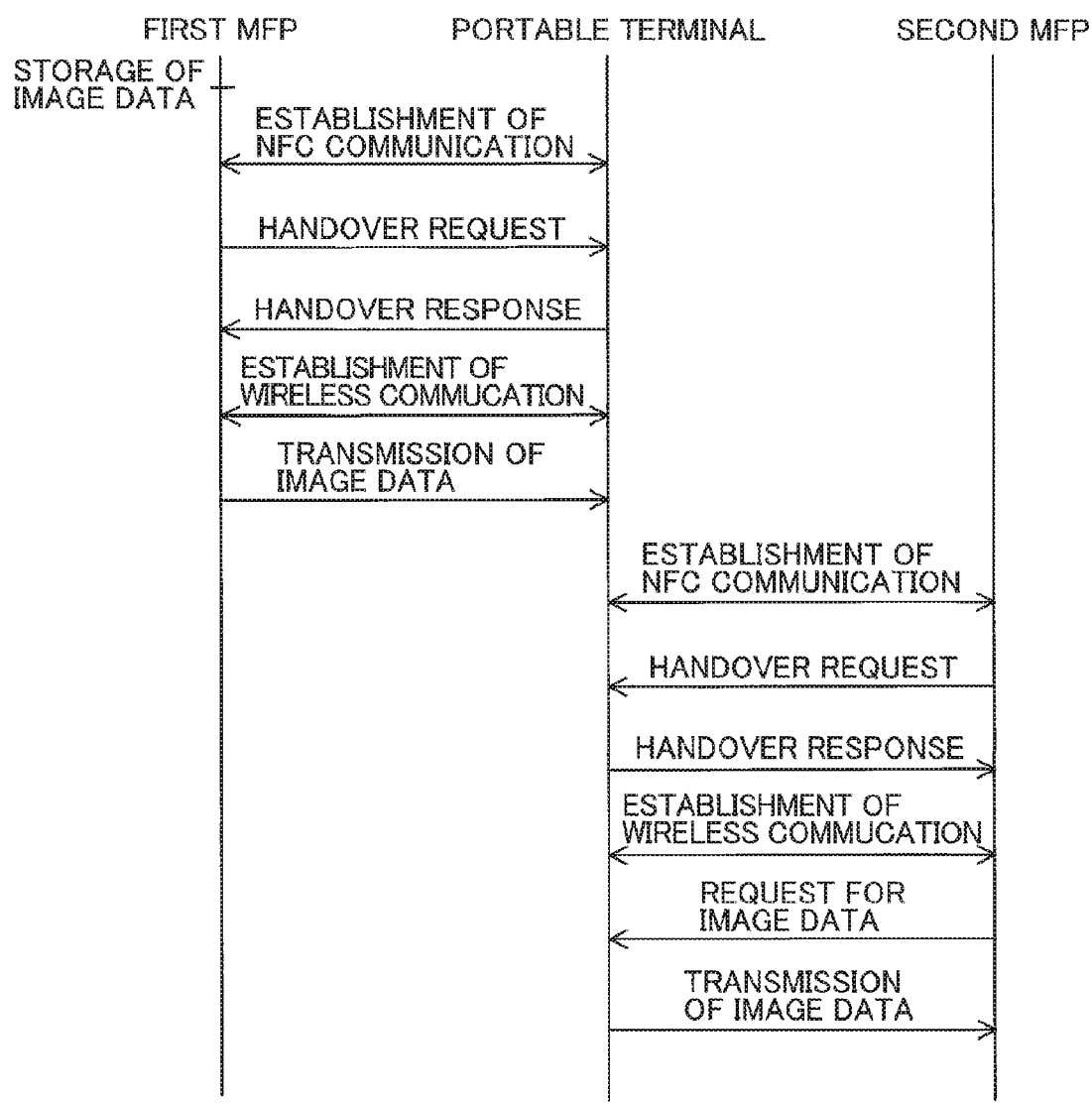
FIG. 13 illustrates an outline of communication performed in an image forming system according to the second embodiment.

When the portable terminal 3 is brought to a position close to the first MFP 2, NFC communication is established between the NFC communication unit 15 of the first MFP 2 and the NFC communication unit 32 of the portable terminal 3 as illustrated in FIG. 13.

After NFC communication is established, the CPU 24 of the first MFP 2 controls the NFC communication unit 15 to transmit, to the NFC communication unit 32 of the portable terminal 3 through NFC communication, a request for handover of wireless communication. When receiving the handover request, the CPU 41 of the portable terminal 3 controls the NFC communication unit 32 to transmit, to the NFC communication unit 15 of the first MFP 2, information such as the IP address of the portable terminal 3 that is necessary for establishing wireless communication (handover response). As a result, wireless communication is established between the network communication unit 16 of the first MFP 2 and the wireless communication unit 34 of the portable terminal 3.

After wireless communication is established, the CPU 24 of the first MFP 2 controls the network communication unit 16 to transmit, to the wireless communication unit 34 of the portable terminal 3, the image data and the print condition contained in the print job. When the wireless communication unit 34 of the portable terminal 3 receives the image data and the print condition, the CPU 41 stores the received image data and print condition in the RAM 43.

When the portable terminal 3 is brought to a position close to the second MFP 2, NFC communication is established between the NFC communication unit 15 of the second MFP 2 and the NFC communication unit 32 of the portable terminal 3.

After NFC communication is established, the CPU 24 of the second MFP 2 controls the NFC communication unit 15 to transmit a request for handover of wireless communication through NFC communication to the NFC communication unit 32 of the portable terminal 3. Upon receipt of the handover request, the CPU 41 of the portable terminal 3 controls the NFC communication unit 32 to transmit to the NFC communication unit 15 of the second MFP 2 information such as the IP address of the portable terminal 3 that is necessary for establishing wireless communication (handover response). As a result, wireless communication is established between the network communication unit 16 of the second MFP 2 and the wireless communication unit 34 of the portable terminal 3.

After wireless communication is established, the CPU 24 of the second MFP 2 controls the network communication unit 16 to transmit, to the wireless communication unit 34 of the portable terminal 3, a request for transmission of the image data. Upon receipt of the request, the CPU 41 of the portable terminal 3 controls the wireless communication unit 34 to transmit, to the network communication unit 16 of the second MFP 2, the image data and the print condition that are stored in the RAM 43 of the portable terminal 3. When the network communication unit 16 of the second MFP 2 receives the image data and the print condition, the CPU 24 of the second MFP 2 controls the image forming unit 11 to print images based on the image data and according to the print condition.

<Operational Advantages>

Similarly to the image forming system 1 according to the first embodiment, also in the image forming system 1 according to the second embodiment, it is unnecessary to set, to the first MFP 2, positional information of the second MFP 2 which is a transfer destination. Image data can be transferred from the first MFP 2 to the second MFP 2 by a user simply operating the portable terminal 3 to perform NFC communication between the portable terminal 3 and the first MFP 2 and perform NFC communication between the portable terminal 3 and the second MFP 2.

<Third Embodiment>

Figure 14:
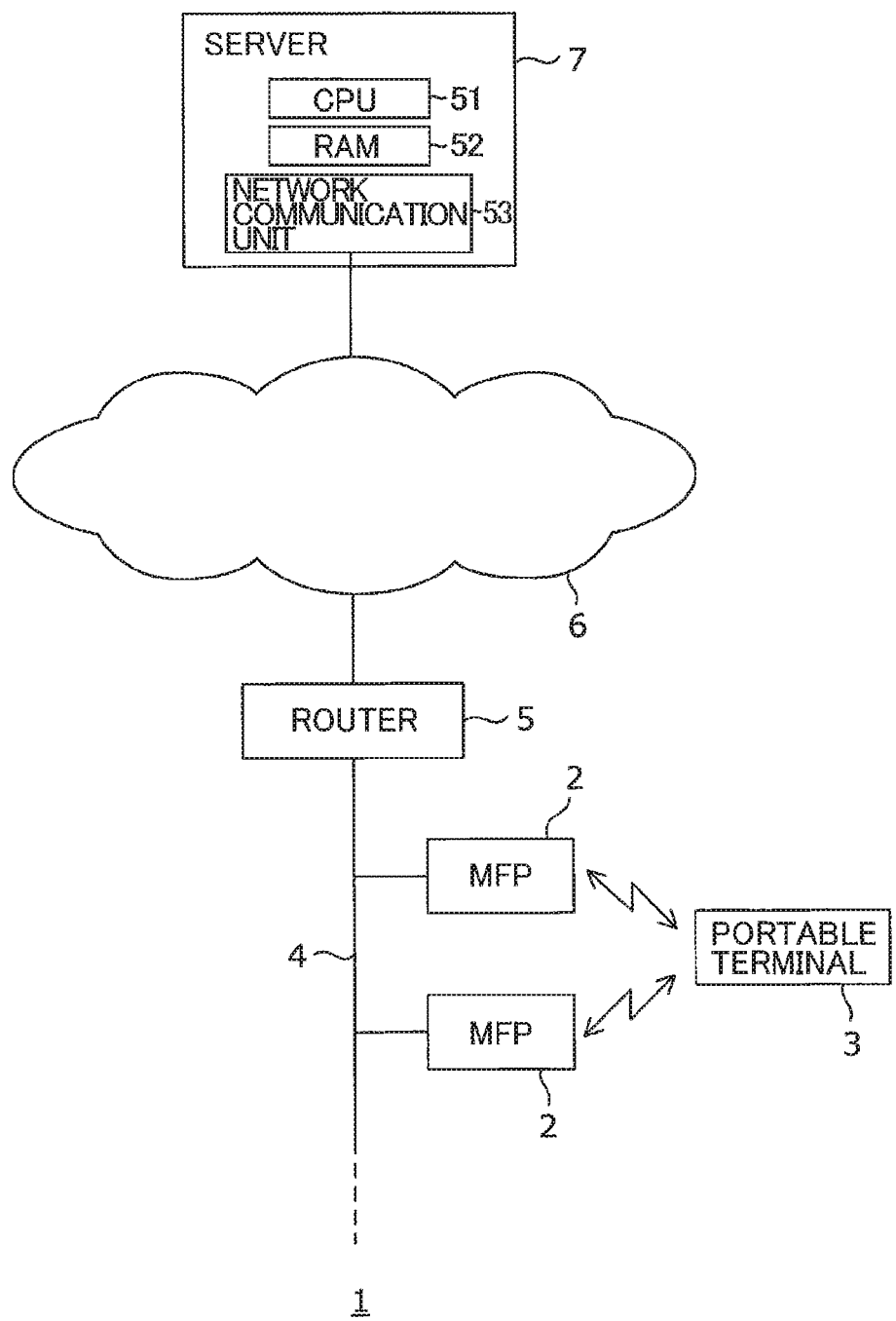
FIG. 14 schematically illustrates an image forming system according to a third embodiment.

In an image forming system 1 according to a third embodiment, as illustrated in FIG. 14, a server 7 connected to the Internet 6 is used to transfer image data from the first MFP 2 to the second MFP 2.

<Outline of Communication>

In the image forming system 1 illustrated in FIG. 14, in a case where the image forming unit 11 of the first MFP 2 is unable to perform a print job immediately after the print job is stored in the RAM 23 of the first MFP 2, the print job can be performed by the second MFP 2 according to the following sequence.

Figure 15:
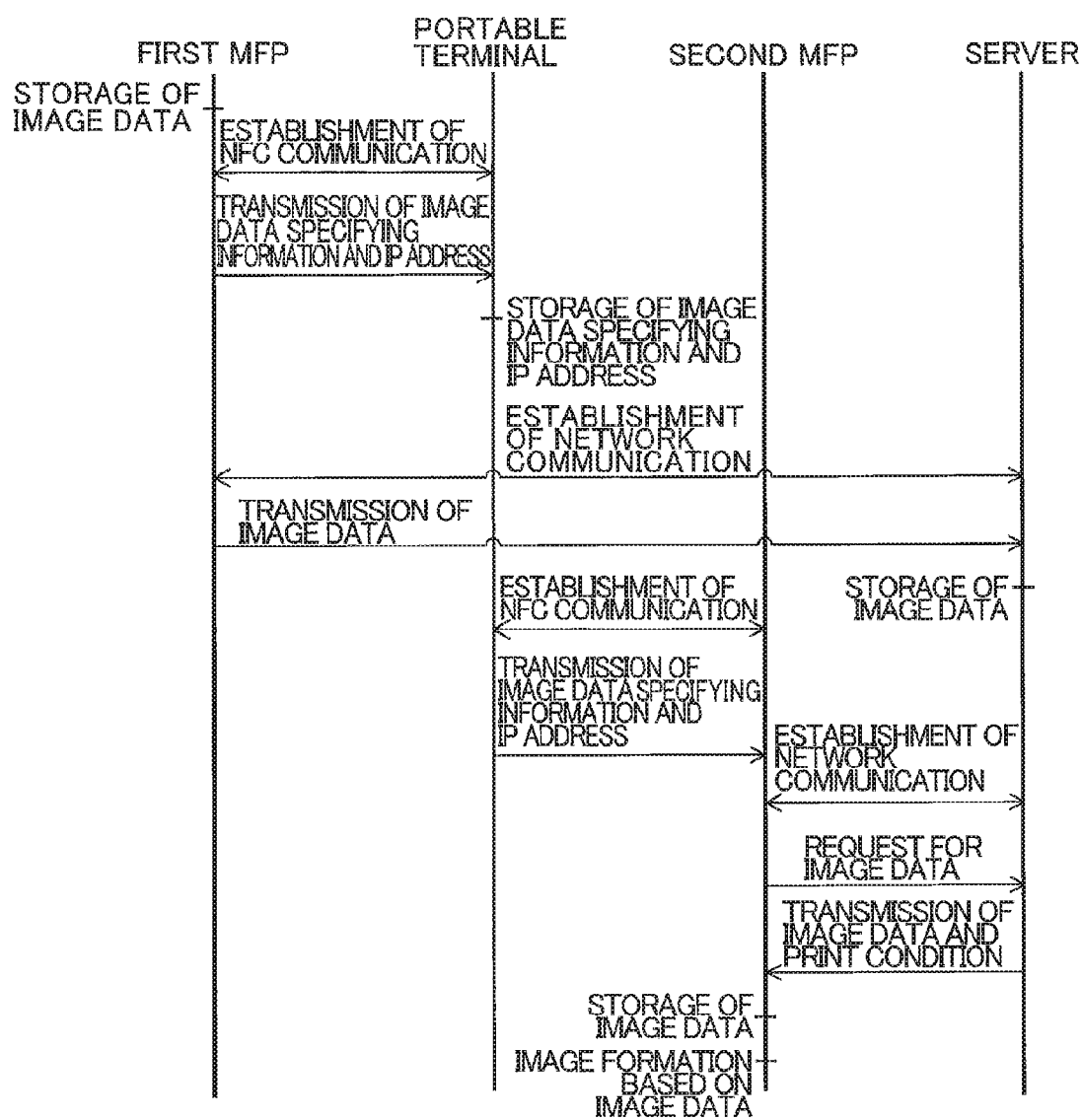
FIG. 15 illustrates an outline of communication performed in the image forming system according to the third embodiment.

When the NFC communication unit 32 of the portable terminal 3 is brought to a position close to the NFC communication unit 15 of the first MFP 2, NFC communication is established between the NFC communication unit 15 of the first MFP 2 and the NFC communication unit 32 of the portable terminal 3 as illustrated in FIG. 15.

After NFC communication is established, the CPU 24 of the first MFP 2 controls the NFC communication unit 15 to transmit, to the NFC communication unit 32 of the portable terminal 3 through NFC communication, the IP address of the server 7 and image data specifying information containing information that can specify image data when the image data will be stored in the server 7. When the NFC communication unit 32 of the portable terminal 3 receives the image data specifying information and the IP address of the server 7, the CPU 41 of the portable terminal 3 stores the image data specifying information and the IP address of the server 7 in the RAM 43.

The CPU 24 of the first MFP 2 controls the network communication unit 16 to establish network communication between the network communication unit 16 and the network communication unit 53 of the server 7. Thus, the network communication unit 16 of the first MFP 2 and the network communication unit 53 of the server 7 are connected through network communication. Then, the CPU 24 of the first MFP 2 controls the network communication unit 16 to transmit, to the server 7 through network communication, image data and print condition which are contained in the print job. A CPU 51 in the server 7 stores, in a storage unit 52 of the server 7, the image data and the print condition which are received by the network communication unit 53.

When the NFC communication unit 32 of the portable terminal 3 is brought to a position close to the NFC communication unit 15 of the second MFP 2, NFC communication is established between the NFC communication unit 15 of the second MFP 2 and the NFC communication unit 32 of the portable terminal 3.

After NFC communication is established, the CPU 41 of the portable terminal 3 controls the NFC communication unit 32 to transmit, to the NFC communication unit 15 of the second MFP 2 through NFC communication, the IP address of the server 7 and the image data specifying information stored in the RAM 43 of the portable terminal 3.

When the NFC communication unit 15 of the second MFP 2 receives the image data specifying information and the IP address of the server 7, the CPU 24 of the second MFP 2 controls the network communication unit 16 to establish network communication between the network communication unit 16 and the network communication unit 53 of the server 7 specified by the IP address of the server 7. Thus, the network communication unit 16 of the second MFP 2 and the network communication unit 53 of the server 7 are connected through network communication.

Then, the CPU 24 in the second MFP 2 controls the network communication unit 16 to transmit, to the network communication unit 53 of the server 7 through network communication, a request for transmission of image data specified by the image data specifying information. Upon receipt of the request, the CPU 51 of the server 7 controls the network communication unit 53 to transmit, to the network communication unit 16 of the second MFP 2, the image data and the print condition.

When the network communication unit 16 of the second MFP 2 receives the image data and the print condition, the CPU 24 of the second MFP 2 stores the received image data and print condition in the RAM 23, and controls the image forming unit 11 to print images based on the image data and according to the print condition.

<Operational Advantages>

Similarly to the image forming system 1 according to the first embodiment, also in the image forming system 1 according to the third embodiment, it is unnecessary to set, to the first MFP 2, positional information of the second MFP 2 which is a transfer destination. Image data can be transferred from the first MFP 2 to the second MFP 2 via the server 7 by a user simply operating the portable terminal 3 to perform NFC communication between the portable terminal 3 and the first MFP 2 and perform NFC communication between the portable terminal 3 and the second MFP 2.

<Modifications>

In the above-described third embodiment, after the image data specifying information and the IP address of the server 7 are transmitted from the NFC communication unit 15 of the first MFP 2 to the NFC communication unit 32 of the portable terminal 3, the image data specifying information and the IP address of the server 7 are transmitted from the NFC communication unit 32 of the portable terminal 3 to the NFC communication unit 15 of the second MFP 2.

However, this configuration may be modified similarly to the modification of the first embodiment. That is, after the image data specifying information and the IP address of the server 7 are transmitted from the NFC communication unit 15 of the first MFP 2 to the NFC communication unit 32 of the portable terminal 3, the CPU 41 of the portable terminal 3 may generate image data specifying information that is different from the received image data specifying information and generate communication setting information that is different from the received IP address, and store the generated image data specifying information and communication setting information in the RAM 43. The NFC communication unit 32 of the portable terminal 3 transmits the generated image data specifying information and communication setting information to the NFC communication unit 15 of the second MFP 2.

<Other Embodiments>

While the description has been made in detail with reference to specific embodiments thereof, it would be apparent to those skilled in the art that various changes and modifications may be made therein without departing from the spirit and scope of the above described embodiments.

For example, in the embodiments described above, NFC communication is established by bringing the NFC communication unit 32 of the portable terminal 3 to a position close to the NFC communication unit 15 of the first MFP 2 or the NFC communication unit 15 of the second MFP 2. However, instead of the NFC communication, infrared communication may be established between the portable terminal 3 and each MFP 2. The infrared communication is another example of the near-field type wireless communication.

The CPU 41 of the portable terminal 3 may be configured of an active type that is activated upon receipt of power supplied from a power source such as a battery. The NFC communication unit 15 of the MFP 2 may be configured of a passive type. In this case, when NFC communication is established between the NFC communication unit 15 of the MFP 2 and the NFC communication unit 32 of the portable terminal 3, the NFC communication unit 15 rectifies the electric current flowing through the antenna to generate power necessary for the IC chip in the NFC communication unit 15 to operate. Similarly, the CPU 41 of the portable terminal 3 may be configured of a passive type that requires no power source such as a battery. In this case, when NFC communication is established between the NFC communication unit 32 and the NFC communication unit 15 of the MFP 2, the NFC communication unit 32 rectifies the electric current flowing through the antenna to generate power necessary for the CPU 41 to operate. In this case, the portable terminal 3 may be configured as an IC card.

In the embodiment described above, as shown in FIG. 6, after NFC communication is established between the NFC communication unit 32 of the portable terminal 3 and the NFC communication unit 15 of the first MFP 2, in S22, the CPU 41 of the portable terminal 3 controls the NFC communication unit 32 to transmit the terminal identification information unique to the portable terminal 3 to the NFC communication unit 15 of the first MFP 2. However, this configuration may be modified. For example, information which can specify the portable terminal 3 may be extracted from among NFC communication connection information that is transmitted from the NFC communication unit 32 of the portable terminal 3 to the NFC communication unit 15 of the first MFP 2 when NFC communication is established between the NFC communication unit 32 of the portable terminal 3 and the NFC communication unit 15 of the first MFP 2. The extracted information is used as the terminal identification information unique to the portable terminal 3. In this case, there is no need to transmit, to the NFC communication unit 15 of the first MFP 2, the terminal identification information unique to the portable terminal 3 after NFC communication is established.

In the above-described embodiments and modifications, the MFP 2 serves as an example of the image forming apparatus. However, a printing apparatus which has no scanner function may also serve as an example of the image forming apparatus as long as the printing apparatus has a printer function.

In the first modification of the first communication process shown in FIG. 11B, the processes of S12, 813, and S14 may be omitted. In this case, in S111, the CPU 24 extracts, from the RAM 23, all of those print jobs for which image formation by the image forming unit 11 is not completed, regardless of whether or not the print jobs contain the user ID. Similarly, in the second modification of the first communication process shown in FIG. 11C, the processes of S12, S13, and S14 may be omitted. In this case, in S121, the CPU 24 extracts, from the RAM 23, all of those print jobs for which the image forming unit 11 has stopped printing in the middle of printing due to the print disabled state, regardless of whether or not the print jobs contain the user ID.

What is claimed is:

1. An image forming system comprising:
a first image forming apparatus;
a second image forming apparatus; and
a portable terminal,
the first image forming apparatus comprising:
a first storage unit;
a first image forming unit configured to form an image on a recording medium;
a first communication unit configured to perform a first type communication that is a near-field type wireless communication;
a second communication unit configured to perform a second type communication having a communication rate faster than a communication rate of the first type communication; and
a first controller,
the second image forming apparatus comprising:
a second storage unit;
a second image forming unit configured to form an image on a recording medium;
a third communication unit configured to perform the first type communication;
a fourth communication unit configured to perform the second type communication; and
a second controller,
the portable terminal comprising:
a terminal storage unit;
a fifth communication unit configured to perform the first type communication; and
a terminal controller,
the first controller being configured to perform:
storing image data in the first storage unit; and
controlling the first communication unit to transmit first data to the fifth communication unit, the first data containing: image data specifying information specifying the image data stored in the first storage unit; and communication setting information necessary for establishing the second type communication between the second communication unit and the fourth communication unit,
the terminal controller being configured to perform:
storing, in the terminal storage unit, second data that corresponds to the first data received by the fifth communication unit, the second data containing: image data specifying information specifying the image data stored in the first storage unit; and communication setting information necessary for establishing the second type communication between the second communication unit and the fourth communication unit; and
controlling the fifth communication unit to transmit, to the third communication unit, the second data stored in the terminal storage unit,
the second controller being configured to perform:
controlling the fourth communication unit to establish the second type communication between the second communication unit and the fourth communication unit based on the communication setting information contained in the second data received by the third communication unit; and
after the second type communication is established between the second communication unit and the fourth communication unit, controlling the fourth communication unit to transmit, to the second communication unit, a request for transmission of the image data specified by the image data specifying information contained in the second data,
the first controller being configured to perform:
controlling the second communication unit to transmit to the fourth communication unit the image data whose transmission is requested in the request received by the second communication unit, and
the second controller being configured to perform:
storing, in the second storage unit, the image data received by the fourth communication unit; and
controlling the second image forming unit to form an image on a recording medium based on the image data stored in the second storage unit.

2. The image forming system according to claim 1, wherein the second data is the same as the first data.

3. The image forming system according to claim 1, wherein the first controller is configured to perform:
selecting, from among one or more sets of image data stored in the first storage unit, at least one set of image data for which image formation by the first image forming unit is not completed, wherein the image data specifying information specifies the selected image data.

4. The image forming system according to claim 3, wherein the first controller is configured to select, from among the one or more sets of image data stored in the first storage unit, at least one set of image data based on which the first image forming unit has not completed performing image formation and based on which the first image forming unit is incapable of completing image formation.

5. The image forming system according to claim 4, wherein the second image forming apparatus further comprises a display unit,
wherein the first controller is configured to perform:
after the second type communication is established between the second communication unit and the fourth communication unit and the first image forming unit starts forming an image on a recording medium based on the selected image data, controlling the second communication unit to transmit, to the fourth communication unit, information indicating that an image is being formed on a recording medium based on the selected image data by the first image forming unit, and
wherein the second controller is configured to perform:
upon receipt by the fourth communication unit of the information indicating that an image is being formed on a recording medium based on the selected image data by the first image forming unit, controlling the display unit to display information indicating that an image is being formed on a recording medium by the first image forming unit based on the selected image data.

6. The image forming system according to claim 4, wherein when the first image forming unit stops forming an image based on a set of image data in the middle of formation of the image, the first controller selects part of the set of image data based on which the first image forming unit has not formed an image, the image data specifying information specifying the selected part of the set of image data.

7. The image forming system according to claim 3, wherein the first controller is configured to perform:
controlling the first image forming unit to suspend formation of an image based on image data other than the selected image data until transmission of the selected image data from the second communication unit to the fourth communication unit is completed.

8. The image forming system according to claim 1, wherein the first storage unit stores one or more sets of image data in association with one or more sets of data identifying information, respectively,
wherein the terminal controller is configured to perform:
controlling the fifth communication unit to transmit, to the first communication unit, terminal identifying information unique to the portable terminal,
wherein the first controller is configured to perform:
selecting, from among the one or more sets of image data stored in the first storage unit, at least one set of image data whose associating data identifying information has a prescribed relationship with the terminal identifying information received by the first communication unit, and
wherein the image data specifying information specifies the selected image data.

9. The image forming system according to claim 8, wherein the portable terminal further comprises a terminal display unit,
wherein the first controller is configured to perform:
when the first storage unit stores no sets of image data whose associating data identifying information has the prescribed relationship with the terminal identifying information received by the first communication unit, controlling the first communication unit to transmit, to the fifth communication unit, information indicating that the first storage unit stores no sets of image data that have the prescribed relationship with the portable terminal, and
wherein the terminal controller is configured to perform:
upon receipt by the fifth communication unit of the information indicating that the first storage unit stores no sets of image data that have the prescribed relationship with the portable terminal, controlling the terminal display unit to display information indicating that the first storage unit stores no sets of image data that have the prescribed relationship with the portable terminal.

10. The image forming system according to claim 1, wherein the terminal controller is configured to be activated by using electric wave energy that is emitted from one of the first communication unit and the third communication unit.

11. The image forming system according to claim 1, wherein at least one of the first communication unit and the third communication unit is configured to be activated to perform the first type communication by using electric wave energy that is emitted from the fifth communication unit.

12. An image forming system comprising:
a first image forming apparatus;
a second image forming apparatus;
a portable terminal; and
a server,
the first image forming apparatus comprising:
a first storage unit;
a first image forming unit configured to form an image on a recording medium;
a first communication unit configured to perform a first type communication that is a near-field type wireless communication;
a second communication unit configured to perform a second type communication having a communication rate faster than a communication rate of the first type communication; and
a first controller,
the second image forming apparatus comprising:
a second storage unit;
a second image forming unit configured to form an image on a recording medium;
a third communication unit configured to perform the first type communication;
a fourth communication unit configured to perform the second type communication; and
a second controller,
the portable terminal comprising:
a terminal storage unit;
a fifth communication unit configured to perform the first type communication; and
a terminal controller,
the server comprising:
a server storage unit;
a server communication unit configured to perform the second type communication; and
a server controller, the first controller being configured to perform:
  storing image data in the first storage unit,
  controlling the first communication unit to transmit first server communication data to the fifth communication unit, the first server communication data containing: image data specifying information that is capable of specifying the image data when the image data is stored in the server storage unit; and communication setting information necessary for establishing the second type communication between the server communication unit and the fourth communication unit,
the terminal controller being configured to perform:
  storing, in the terminal storage unit, second server communication data that corresponds to the first server communication data received by the fifth communication unit, the second server communication data containing: image data specifying information that is capable of specifying the image data when the image data is stored in the server storage unit; and
communication setting information necessary for establishing the second type communication between the server communication unit and the fourth communication unit,
the first controller being configured to perform:
  controlling the second communication unit to transmit the image data stored in the first storage unit to the server communication unit,
the server controller being configured to perform:
  storing, in the server storage unit, the image data received by the server communication unit,
the terminal controller being configured to perform:
  controlling the fifth communication unit to transmit, to the third communication unit, the second server communication data stored in the terminal storage unit,
the second controller being configured to perform:
  controlling the fourth communication unit to establish the second type communication between the server communication unit and the fourth communication unit based on the communication setting information contained in the second server communication data received by the third communication unit; and
  after the second type communication is established between the server communication unit and the fourth communication unit, controlling the fourth communication unit to transmit, to the server communication unit, a request for transmission of the image data specified by the image data specifying information contained in the second server communication data,
the server controller being configured to perform:
  controlling the server communication unit to transmit to the fourth communication unit the image data whose transmission is requested in the request received by the server communication unit, and
the second controller being configured to perform:
  storing, in the second storage unit, the image data received by the fourth communication unit; and
  controlling the second image forming unit to form an image on a recording medium based on the image data stored in the second storage unit.

13. An image forming method for an image forming system comprising: a first image forming apparatus; a second image forming apparatus; and a portable terminal,
the first image forming apparatus comprising: a first storage unit; a first image forming unit configured to form an image on a recording medium; a first communication unit configured to perform a first type communication that is a near-field type wireless communication; a second communication unit configured to perform a second type communication having a communication rate faster than a communication rate of the first type communication; and a first controller,
the second image forming apparatus comprising: a second storage unit; a second image forming unit configured to form an image on a recording medium; and a third communication unit configured to perform the first type communication; a fourth communication unit configured to perform the second type communication; and a second controller,
the portable terminal comprising: a terminal storage unit; and a fifth communication unit configured to perform the first type communication,
the method comprising:
  storing image data in the first storage unit;
  after storage of image data in the first storage unit, transmitting first data from the first communication unit to the fifth communication unit, the first data containing: image data specifying information specifying the image data stored in the first storage unit; and communication setting information necessary for establishing the second type communication between the second communication unit and the fourth communication unit;
  after transmission of the first data from the first communication unit to the fifth communication unit, storing, in the terminal storage unit, second data that corresponds to the first data received by the fifth communication unit, the second data containing: image data specifying information specifying the image data stored in the first storage unit; and communication setting information necessary for establishing the second type communication between the second communication unit and the fourth communication unit;
  after storage of the second data in the terminal storage unit, transmitting, from the fifth communication unit to the third communication unit, the second data stored in the terminal storage unit;
  after transmission of the second data from the fifth communication unit to the third communication unit, establishing the second type communication between the second communication unit and the fourth communication unit based on the communication setting information contained in the second data received by the third communication unit;
  after establishment of the second type communication between the second communication unit and the fourth communication unit, transmitting, from the fourth communication unit to the second communication unit, a request for transmission of the image data specified by the image data specifying information contained in the second data;
  after transmission of the request, transmitting, from the second communication unit to the fourth communication unit, the image data whose transmission is requested in the request received by the second communication unit;
  after transmission of the image data from the second communication unit to the fourth communication unit, storing, in the second storage unit, the image data received by the fourth communication unit; and after storage of the image data in the second storage unit, forming an image on a recording medium by the second image forming unit based on the image data stored in the second storage unit.

14. An image forming apparatus that constitutes, together with another image forming apparatus and a portable terminal, an image forming system, the portable terminal comprising a terminal communication unit configured to perform a first type communication that is a near-field type wireless communication, the another image forming apparatus comprising: an image data storage unit; and a communication unit configured to perform a second type communication having a communication rate faster than a communication rate of the first type communication;

the image forming apparatus comprising:
a storage unit;
an image forming unit configured to form an image on a recording medium;
a low-communication-rate communication unit configured to perform the first type communication;
a high-communication-rate communication unit configured to perform the second type communication; and
a controller, the controller being configured to perform:
receiving, by the low-communication-rate communication unit, first data that is transmitted via the terminal communication unit of the portable terminal through the first type communication, the first data containing: image data specifying information specifying the image data stored in the image data storage unit; and communication setting information necessary for establishing the second type communication between the communication unit and the high-communication-rate communication unit;
controlling the high-communication-rate communication unit to establish the second type communication between the communication unit of the another image forming apparatus and the high-communication-rate communication unit based on the communication setting information contained in the first data that is transmitted from the terminal communication unit of the portable terminal and is received by the low-communication-rate communication unit;
after establishment of the second type communication between the communication unit of the another image forming apparatus and the high-communication-rate communication unit, controlling the high-communication-rate communication unit to transmit, to the communication unit of the another image forming apparatus, a request for transmission of the image data specified by the image data specifying information;
after transmission of the request for transmission, storing, in the storage unit, image data that is transmitted from the communication unit of the another image forming apparatus and is received by the high-communication-rate communication unit; and
controlling the image forming unit to form an image on a recording medium based on the image data stored in the storage unit.

15. An image forming apparatus that constitutes, together with another image forming apparatus and a portable terminal, an image forming system, the portable terminal comprising a terminal communication unit configured to perform a first type communication that is a near-field type wireless communication, the another image forming apparatus comprising a communication unit configured to perform a second type communication having a communication rate faster than a communication rate of the first type communication;

the image forming apparatus comprising:
a storage unit;
an image forming unit configured to form an image on a recording medium;
a low-communication-rate communication unit configured to perform the first type communication;
a high-communication-rate communication unit configured to perform the second type communication; and
a controller, the controller being configured to perform:
storing image data in the storage unit;
controlling the low-communication-rate communication unit to transmit first data to the terminal communication unit of the portable terminal, the first data containing: image data specifying information specifying the image data stored in the storage unit; and communication setting information necessary for establishing the second type communication between the high-communication-rate communication unit and the communication unit of the another image forming apparatus;
controlling the high-communication-rate communication unit to establish the second type communication between the high-communication-rate communication unit and the communication unit of the another image forming apparatus in response to a request for establishment of the second type communication that is transmitted from the communication unit of the another image forming apparatus to the high-communication-rate communication unit; and
after establishment of the second type communication between the high-communication-rate communication unit and the communication unit of the another image forming apparatus and in response to a request for transmission of the image data specified by the image data specifying information, controlling the high-communication-rate communication unit to transmit to the communication unit of the another image forming apparatus the image data whose transmission is requested in the request.

16. A non-transitory computer readable storage medium storing a set of program instructions for an image forming apparatus, the image forming apparatus, together with another image forming apparatus and a portable terminal, constituting an image forming system, the portable terminal comprising a terminal communication unit configured to perform a first type communication that is a near-field type wireless communication, the another image forming apparatus comprising: an image data storage unit; and a communication unit configured to perform a second type communication having a communication rate faster than a communication rate of the first type communication, the image forming apparatus comprising:
  a storage unit;
  an image forming unit configured to form an image on a recording medium;
  a low-communication-rate communication unit configured to perform the first type communication; and
  a high-communication-rate communication unit configured to perform the second type communication, and
the program instructions, when executed by a computer in the image forming apparatus, controlling the image forming apparatus to perform:
  receiving, by the low-communication-rate communication unit, first data that is transmitted from the terminal communication unit of the portable terminal through the first type communication, the first data containing: image data specifying information specifying the image data stored in the image data storage unit; and communication setting information necessary for establishing the second type communication between the communication unit and the high-communication-rate communication unit;
  controlling the high-communication-rate communication unit to establish the second type communication between the communication unit of the another image forming apparatus and the high-communication-rate communication unit based on the communication setting information contained in the first data that is transmitted from the terminal communication unit of the portable terminal and is received by the low-communication-rate communication unit;
  after establishment of the second type communication between the communication unit of the another image forming apparatus and the high-communication-rate communication unit, controlling the high-communication-rate communication unit to transmit, to the communication unit of the another image forming apparatus, a request for transmission of the image data specified by the image data specifying information;
  after transmission of the request for transmission, storing, in the storage unit, image data that is transmitted from the communication unit of the another image forming apparatus and is received by the high-communication-rate communication unit; and
  controlling the image forming unit to form an image on a recording medium based on the image data stored in the storage unit.

17. An image forming system comprising:
a first image forming apparatus;
a second image forming apparatus; and
a portable terminal,
the first image forming apparatus comprising:
  a first storage unit;
  a first image forming unit configured to form an image on a recording medium;
  a first communication circuit configured to transmit and receive data at a first communication rate through a first type communication that is a near-field type wireless communication;
  a second communication circuit configured to transmit and receive data at a second communication rate through a second type communication, the second communication rate being faster than the first communication rate; and
  a first controller including a first processor and a first memory storing first instructions,
the second image forming apparatus comprising:
  a second storage unit;
  a second image forming unit configured to form an image on a recording medium;
  a third communication circuit configured to transmit and receive data at the first communication rate through the first type communication;
  a fourth communication circuit configured to transmit and receive data at the second communication rate through the second type communication; and
  a second controller including a second processor and a second memory storing second instructions,
the portable terminal comprising:
  a terminal storage unit;
  a fifth communication circuit configured to transmit and receive data at the first communication rate through the first type communication; and
  a terminal controller including a terminal processor and a terminal memory storing terminal instructions,
the first instructions, when executed by the first processor, causing the first controller to perform:
  storing image data in the first storage unit; and
  controlling the first communication circuit to transmit first data to the fifth communication circuit, the first data containing: image data specifying information specifying the image data stored in the first storage unit; and communication setting information necessary for establishing the second type communication between the second communication circuit and the fourth communication circuit,
the terminal instructions, when executed by the terminal processor, causing the terminal controller to perform:
  storing, in the terminal storage unit, second data that corresponds to the first data received by the fifth communication circuit, the second data containing: image data specifying information specifying the image data stored in the first storage unit; and communication setting information necessary for establishing the second type communication between the second communication circuit and the fourth communication circuit; and
  controlling the fifth communication circuit to transmit, to the third communication circuit, the second data stored in the terminal storage unit,
the second instructions, when executed by the second processor, causing the second controller to perform:
  controlling the fourth communication circuit to establish the second type communication between the second communication circuit and the fourth communication circuit based on the communication setting information contained in the second data received by the third communication circuit; and
  after the second type communication is established between the second communication circuit and the fourth communication circuit, controlling the fourth communication circuit to transmit, to the second communication circuit, a request for transmission of the image data specified by the image data specifying information contained in the second data;
the first instructions, when executed by the first processor, causing the first controller to perform:
  controlling the second communication circuit to transmit to the fourth communication circuit the image data whose transmission is requested in the request received by the second communication circuit,
the second instructions, when executed by the second processor, causing the second controller to perform:

storing, in the second storage unit, the image data received by the fourth communication circuit; and controlling the second image forming unit to form an image on a recording medium based on the image data stored in the second storage unit.

\* \* \* \* \*